(12) United States Patent
Shimizu

(10) Patent No.: US 11,985,176 B2
(45) Date of Patent: May 14, 2024

(54) VIRTUAL-BREAK-ROOM PROVIDING SYSTEM, VIRTUAL-BREAK-ROOM PROVIDING DEVICE, AND VIRTUAL-BREAK-ROOM PROVIDING METHOD

(71) Applicant: JVCKENWOOD Corporation, Yokohama (JP)

(72) Inventor: Yusuke Shimizu, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/945,143

(22) Filed: Sep. 15, 2022

(65) Prior Publication Data
US 2023/0108082 A1 Apr. 6, 2023

(30) Foreign Application Priority Data

Sep. 24, 2021 (JP) ................................. 2021-155884
Nov. 1, 2021 (JP) ................................. 2021-179028

(51) Int. Cl.
*H04L 65/403* (2022.01)
*G06F 3/01* (2006.01)
*G06V 40/10* (2022.01)
*H04L 65/1069* (2022.01)
*G06F 3/14* (2006.01)

(52) U.S. Cl.
CPC ............ *H04L 65/403* (2013.01); *G06F 3/011* (2013.01); *G06V 40/10* (2022.01); *H04L 65/1069* (2013.01); *G06F 3/14* (2013.01)

(58) Field of Classification Search
CPC ... H04L 65/1069; H04L 65/403; H04L 67/52; G06F 3/011; H04W 4/021; H04W 4/029
USPC ......................................................... 709/204
See application file for complete search history.

(56) References Cited

U.S. PATENT DOCUMENTS

| 9,520,002 B1 * | 12/2016 | Gavriliuc ................ H04L 51/52 |
| 2013/0035114 A1 | 2/2013 | Holden et al. |
| 2017/0257748 A1 | 9/2017 | Takata et al. |
| 2017/0294048 A1 * | 10/2017 | Noguchi ............. G06F 3/04815 |

(Continued)

FOREIGN PATENT DOCUMENTS

JP 2001-142850 5/2001

OTHER PUBLICATIONS

Extended European Search Report for European Patent Application No. 22197080.9 dated Feb. 17, 2023.

*Primary Examiner* — Meng Vang
(74) *Attorney, Agent, or Firm* — Amin, Turocy & Watson, LLP

(57) ABSTRACT

A virtual-break-room providing system includes: a detection device including a detection unit configured to detect, based on a detection result of a position detection sensor about a position of a user, whether the user satisfies a condition to connect to a virtual break room that enables the user to communicate with another user in virtual space; and a terminal device. The terminal device includes a virtual-break-room connection unit configured to connect to the virtual break room when the detection device detects that the user satisfies the condition to connect to the virtual break room, a virtual-break-room-information acquisition unit configured to acquire information about the virtual break room, and an output control unit configured to output the information about the virtual break room.

7 Claims, 30 Drawing Sheets

(56) References Cited

U.S. PATENT DOCUMENTS

| | | |
|---|---|---|
| 2018/0189568 A1 | 7/2018 | Powderly et al. |
| 2019/0334961 A1 | 10/2019 | Van Wie et al. |
| 2020/0033941 A1* | 1/2020 | Joshi .................. G06F 3/04815 |
| 2021/0263168 A1* | 8/2021 | Nguyen ................ G01S 19/396 |
| 2022/0317830 A1* | 10/2022 | Skuratowicz ......... G06F 3/0482 |

* cited by examiner

VIRTUAL-BREAK-ROOM PROVIDING SYSTEM, VIRTUAL-BREAK-ROOM PROVIDING DEVICE, AND VIRTUAL-BREAK-ROOM PROVIDING METHOD

CROSS-REFERENCE TO RELATED APPLICATIONS

This application claims priority from Japanese Application No. 2021-155884, filed on Sep. 24, 2021 and Japanese Application No. 2021-179028, filed on Nov. 1, 2021, the contents of both of which are incorporated by reference herein in its entirety.

BACKGROUND

The present disclosure relates to a virtual-break-room providing system, a virtual-break-room providing device, and a virtual-break-room providing method.

Recently, there have been increasing chances of teleworking at home etc. JP 2001-142850 A discloses a technique which enables informal communication in a group even if the group is a group of teleworkers.

When users work in an office, the users have opportunities to communicate with other users by stand talking or chatting at a location away from the seats of the users. A technique which automatically guides a user to a virtual break room and enables the user to communicate with other users when the user is to get away from a work place and take a break in a telework environment or the like.

SUMMARY

A virtual-break-room providing system according to an embodiment includes: a detection device including a detection unit configured to detect, based on a detection result of a position detection sensor about a position of a user, whether the user satisfies a condition to connect to a virtual break room that enables the user to communicate with another user in virtual space; and a terminal device. The terminal device includes a virtual-break-room connection unit configured to connect to the virtual break room when the detection device detects that the user satisfies the condition to connect to the virtual break room, a virtual-break-room-information acquisition unit configured to acquire information about the virtual break room, and an output control unit configured to output the information about the virtual break room.

A virtual-break-room providing device according to an embodiment includes: a position-information acquisition unit configured to determine whether a user satisfies a condition to connect to a virtual break room that enables the user to communicate with another user in virtual space; a virtual-break-room connection unit configured to connect to the virtual break room when the user is determined to satisfy the condition to connect to the virtual break room; a virtual-break-room-information acquisition unit configured to acquire information about the virtual break room; and an output control unit configured to output the information about the virtual break room.

A virtual-break-room providing method according to an embodiment includes: detecting, based on a detection result of a position of a user, whether the user satisfies a condition to connect to a virtual break room that enables the user to communicate with another user in virtual space; connecting to the virtual break room when it is detected that the user satisfies the condition to connect to the virtual break room; acquiring information about the virtual break room; and outputting information about the virtual break room.

DETAILED DESCRIPTION OF THE PREFERRED EMBODIMENTS

Hereinafter, embodiments according to the present disclosure will be described in detail with reference to accompanying drawings. The present disclosure is not limited by these embodiments. In the following embodiments, redundant descriptions are omitted by denoting the same parts by the same reference signs.

First Embodiment

Figure 1:
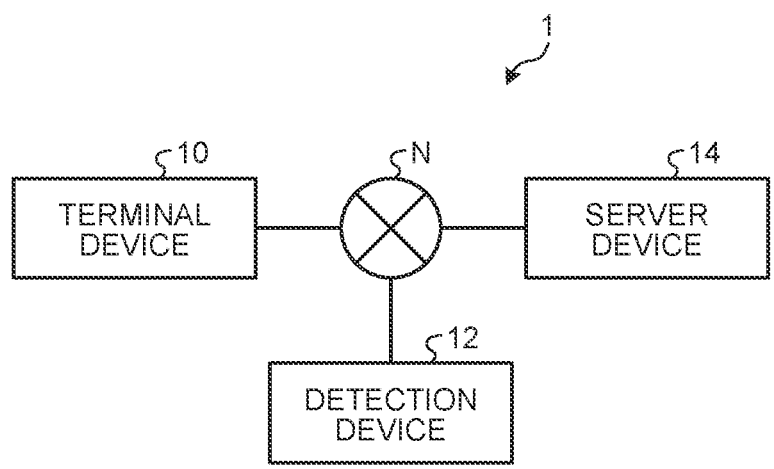
FIG. 1 is a diagram illustrating a configuration example of a virtual-break-room providing system according to a first embodiment.

A configuration example of a virtual-break-room providing system according to a first embodiment will be described by using FIG. 1. FIG. 1 is a diagram illustrating the configuration example of the virtual-break-room providing system according to the first embodiment.

As illustrated in FIG. 1, a virtual-break-room providing system 1 includes a terminal device 10, a detection device 12, and a server device 14. The terminal device 10, the detection device 12, and the server device 14 are communicably connected, for example, via a wireless network N. The virtual-break-room providing system 1 is a system which provides a break room which is virtual (hereinafter, virtual break room) to users when the users enter an area in which the user is determined to be having a break. The user can communicate with other users in the virtual break room.

Terminal Device

Figure 2:
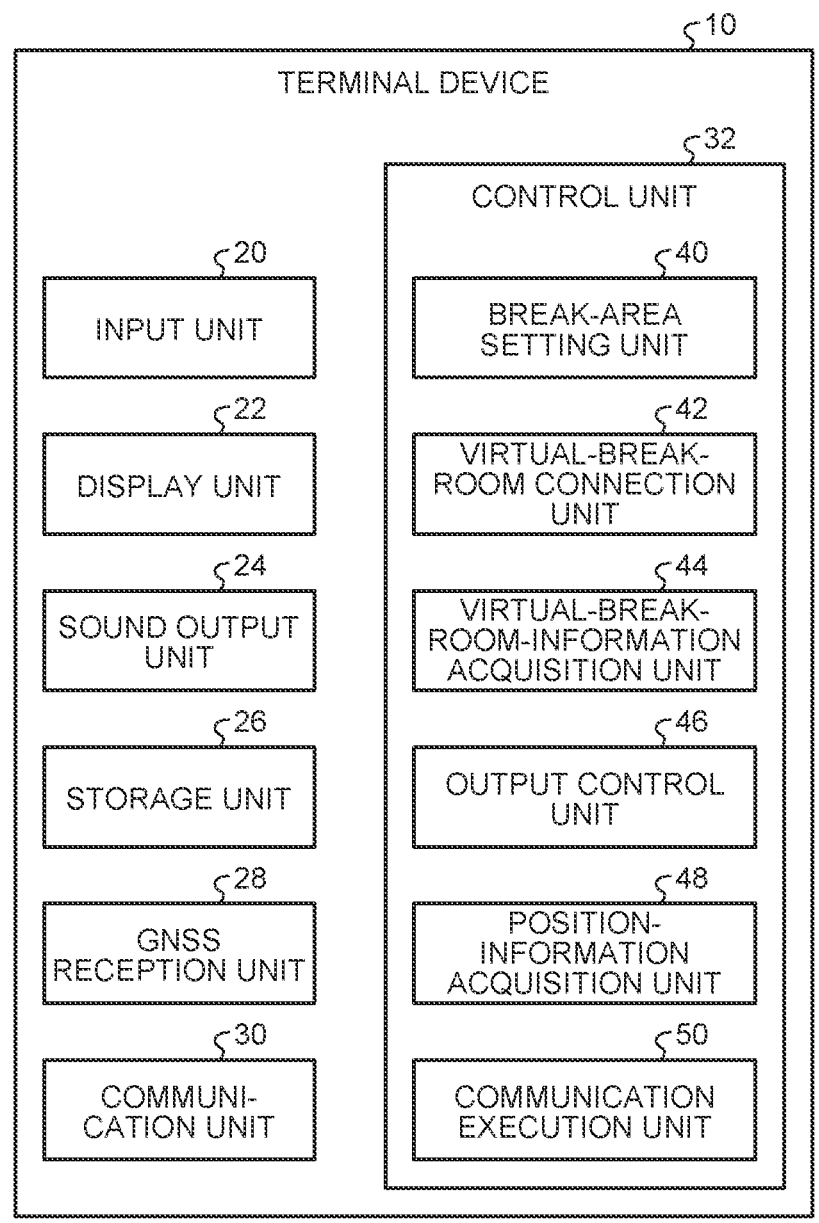
FIG. 2 is a block diagram illustrating a configuration example of a terminal device according to the first embodiment.

A configuration example of the terminal device according to the first embodiment will be described by using FIG. 2. FIG. 2 is a block diagram illustrating the configuration example of the terminal device according to the first embodiment.

As illustrated in FIG. 2, the terminal device 10 is provided with an input unit 20, a display unit 22, a sound output unit 24, a storage unit 26, a Global Navigation Satellite System (GNSS) reception unit 28, a communication unit 30, and a control unit 32. The terminal device 10 is, for example, an information processing terminal such as a smartphone or a tablet terminal.

The input unit 20 receives various input operations with respect to the terminal device 10. The input unit 20 outputs input signals, which are corresponding to the received input operations, to the control unit 32. The input unit 20 includes, for example, a touch screen, buttons, switches, a keyboard, a microphone, etc. In a case in which a touch screen is used as the input unit 20, the input unit 20 is disposed on the display unit 22.

The display unit 22 displays various video including characters and images. The display unit 22 is, for example, a display including a liquid crystal display (LCD: Liquid Crystal Display), or organic Electro-Luminescence (EL). The display unit 22 may be provided in a device different from the terminal device 10. For example, the display unit 22 may be a TV, a Head Mounted Display (HMD), a mobile terminal, or a wearable device. The terminal device 10 may be an information processing terminal such as a smart speaker which is not provided with the display unit 22.

The sound output unit 24 is a speaker which outputs sound. The sound output unit 24 outputs the sound corresponding to the image displayed by the display unit 22. The sound output unit 24 outputs the sound of other users.

The storage unit 26 stores, for example, the information of a break area of the user set by a later-described break-area setting unit 40, computation contents of a control unit 32, and information such as programs. The storage unit 26 includes at least one of, for example, main storage devices such as Random Access Memories (RAMs) and Read Only Memories (ROMs) and external storage devices such as Hard Disk Drives (HDDs).

The GNSS reception unit 28 receives GNSS signals, which include the information for specifying position information, from a GNSS satellite, which is not illustrated. The GNSS reception unit 28 can be realized, for example, by a GNSS reception circuit or a GNSS reception device.

The communication unit 30 carries out communication with external devices via the network N. The communication unit 30, for example, communicates with the detection device 12 via the network N. The communication unit 30, for example, communicates with the server device 14 via the network N.

The control unit 32 controls the units of the terminal device 10. The control unit 32 has, for example, an information processing device such as a Central Processing Unit (CPU) or a Micro Processing Unit (MPU) and a storage device such as a RAM or a ROM. The control unit 32 executes a program which controls operation of the terminal device 10 according to the present disclosure. The control unit 32 may be realized, for example, by an integrated circuit such as an Application Specific Integrated Circuit (ASIC) or a Field Programmable Gate Array (FPGA). The control unit 32 may be realized by a combination of hardware and software.

The control unit 32 is provided with the break-area setting unit 40, a virtual-break-room connection unit 42, a virtual-break-room-information acquisition unit 44, an output control unit 46, a position-information acquisition unit 48, and a communication execution unit 50.

The break-area setting unit 40 sets a break area of the user in real space. The break-area setting unit 40 sets the break area of the user in accordance with an input operation input to the input unit 20. Details of the break area will be described later.

The virtual-break-room connection unit 42 connects to a virtual break room in which the user can communicate with other users in virtual space. When entrance of the user into the area set by the break-area setting unit 40 is detected, the virtual-break-room connection unit 42 connects to the virtual break room provided by the server device 14.

The virtual-break-room-information acquisition unit 44 acquires information about the virtual break room from the server device 14. The virtual-break-room-information acquisition unit 44 acquires information about the virtual break room when the virtual-break-room connection unit 42 connects to the virtual break room. The information about the virtual break room includes information about images and sound of the virtual break room.

The output control unit 46 causes the display unit 22 to display various information. The output control unit 46 causes the display unit 22 to display the information about the virtual break room acquired by the virtual-break-room-information acquisition unit 44. The output control unit 46 causes the display unit 22 to display the image of the virtual break room. Details of the images of the virtual break room will be described later. If the terminal device 10 is not provided with the display unit 22, the output control unit 46 causes the sound output unit 24 to output various information by sound.

The position-information acquisition unit 48 acquires GNSS signals from the GNSS reception unit 28. The position-information acquisition unit 48 calculates current position information of the user (the terminal device 10) based on the GNSS signals. The position-information acquisition unit 48 calculates the current position information of the user (the terminal device 10), for example, by global coordinates.

The communication execution unit 50 executes communication between the users by using, for example, the touch screen, the keyboard, and the microphone provided in the input unit 20.

Detection Device

Figure 3:
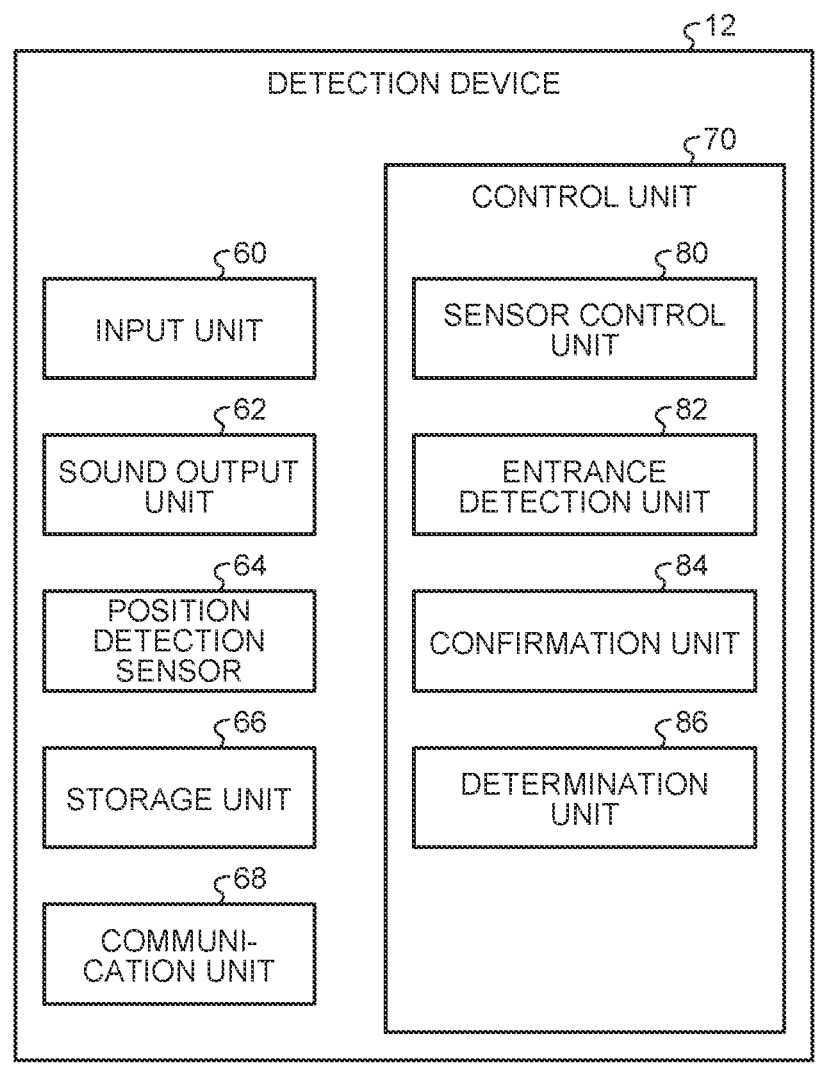
FIG. 3 is a block diagram illustrating a configuration example of a detection device according to the first embodiment.

A configuration example of the detection device according to the first embodiment will be described by using FIG. 3. FIG. 3 is a block diagram illustrating the configuration example of the detection device according to the first embodiment.

As illustrated in FIG. 3, the detection device 12 is provided with an input unit 60, a sound output unit 62, a position detection sensor 64, a storage unit 66, a communication unit 68, and a control unit 70. The detection device 12 includes, for example, a smart speaker.

The input unit 60 receives various input operations with respect to the detection device 12. The input unit 60 outputs input signals, which are corresponding to the received input operations, to the control unit 70. The input unit 60 includes, for example, buttons, switches, etc. The input unit 60 includes, for example, a microphone which detects the sound of the users.

The sound output unit 62 is a speaker which outputs sound. The sound output unit 62 outputs various sound that reminds the user of confirmation.

The position detection sensor 64 detects the position of the user. The position detection sensor 64 is realized, for example, by a single or plural camera(s) which captures images of the user. The position detection sensor 64 is realized, for example, by a human detection sensor which detects a person by changes in reflected waves such as infrared rays, ultrasonic waves, or the like. The position detection sensor 64 is realized, for example, by a pressure sensor which detects the weight of an object.

The storage unit 66 stores information such as computation contents of the control unit 70, programs, etc. The storage unit 66 includes at least one of, for example, a RAM, a main storage device such as a ROM, an external storage device such as a HDD.

The communication unit 68 communicates with an external device via the network N. The communication unit 68, for example, communicates with the terminal device 10 via the network N. The communication unit 68, for example, communicates with the server device 14 via the network N.

The control unit 70 controls the units of the detection device 12. The control unit 70, for example, has an information processing device such as a CPU or a MPU and a storage device such as a RAM or a ROM. The control unit 70 executes a program which controls operation of the detection device 12 according to the present disclosure. The control unit 70 may be realized, for example, by an integrated circuit such as ASIC or FPGA. The control unit 70 may be realized by a combination of hardware and software.

The control unit 70 is provided with a sensor control unit 80, an entrance detection unit 82, a confirmation unit 84, and a determination unit 86.

The sensor control unit 80 controls the position detection sensor 64 to detect the position of the user.

The entrance detection unit 82 detects entrance of the user to a predetermined location determined in advance. The entrance detection unit 82 detects whether the user has entered the break area set in advance. Hereinafter, the entrance detection unit 82 may be referred to as a detection unit. The entrance detection unit 82 detects whether the user has entered the break area, which is set in advance, based on the user position detection result of the position detection sensor 64.

The confirmation unit 84 carries out various confirmation with respect to the user. The confirmation unit 84 carries out various confirmation with respect to the user by outputting sound from the sound output unit 62. The confirmation unit 84 asks the user whether to connect to the virtual break room or not.

The determination unit 86 carries out various determination. The determination unit 86 carries out determination of the user. The determination unit 86 determines whether the user who has entered the break area is the user determined in advance. If the position detection sensor 64 is a camera, the determination unit 86 determines whether the user who has entered the break area is the user who is determined in advance based on images captured by the camera.

Server Device

Figure 4:
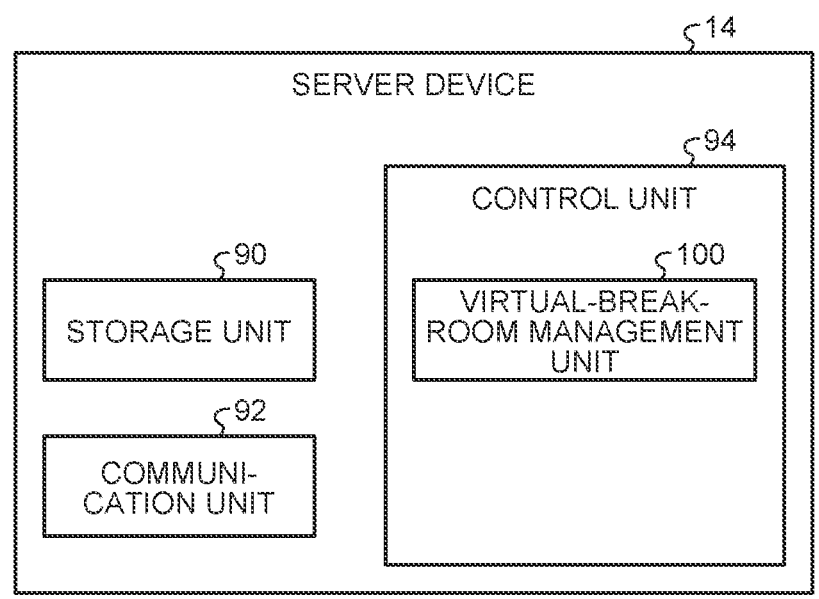
FIG. 4 is a block diagram illustrating a configuration example of a server device according to the first embodiment.

A configuration example of the server device according to the first embodiment will be described by using FIG. 4. FIG. 4 is a block diagram illustrating the configuration example of the server device according to the first embodiment.

As illustrated in FIG. 4, the server device 14 is provided with a storage unit 90, a communication unit 92, and a control unit 94. The server device 14 is disposed at a location away from the terminal device 10 and the detection device 12. The server device 14 is an information terminal such as a personal computer (PC). The server device 14 carries out a process of providing the virtual break room to the user.

The storage unit 90 stores information such as computation contents of the control unit 94 and programs. The storage unit 90 includes at least one of, for example, a main storage device such as a RAM or a ROM and an external storage device such as a HDD.

The storage unit 90 stores information about the virtual break room. The information about the virtual break room includes the information for specifying the virtual break room, the information about the number of users who are in the virtual break room, and the information about the users. The information about the virtual break room may include information such as images and sound of the virtual break room. The storage unit 90 stores information about the users who use the virtual break room. The information about the users includes identification information for uniquely identifying the users. The information about the users is, for example, names, seats, icon images, and connection destination information.

The communication unit 92 communicates with external devices via the network N. The communication unit 92, for example, communicates with the terminal device 10 via the network N. The communication unit 92, for example, communicates with the detection device 12 via the network N.

The control unit 94 controls units of the server device 14. The control unit 94 has, for example, an information processing device such as a CPU or a MPU and a storage device such as a RAM or a ROM. The control unit 94 executes a program which controls operation of the server device 14 according to the present disclosure. The control unit 94 may be realized by, for example, an integrated circuit such as ASIC or FPGA. The control unit 94 may be realized by a combination of hardware and software.

The control unit 94 is provided with a virtual-break-room management unit 100.

The virtual-break-room management unit 100 manages the virtual break room. The virtual-break-room management unit 100 executes various processing about the virtual break room. The virtual-break-room management unit 100 provides the virtual break room to the terminal device 10.

Processing Contents of Virtual-Break-Room Providing System

Figure 5:
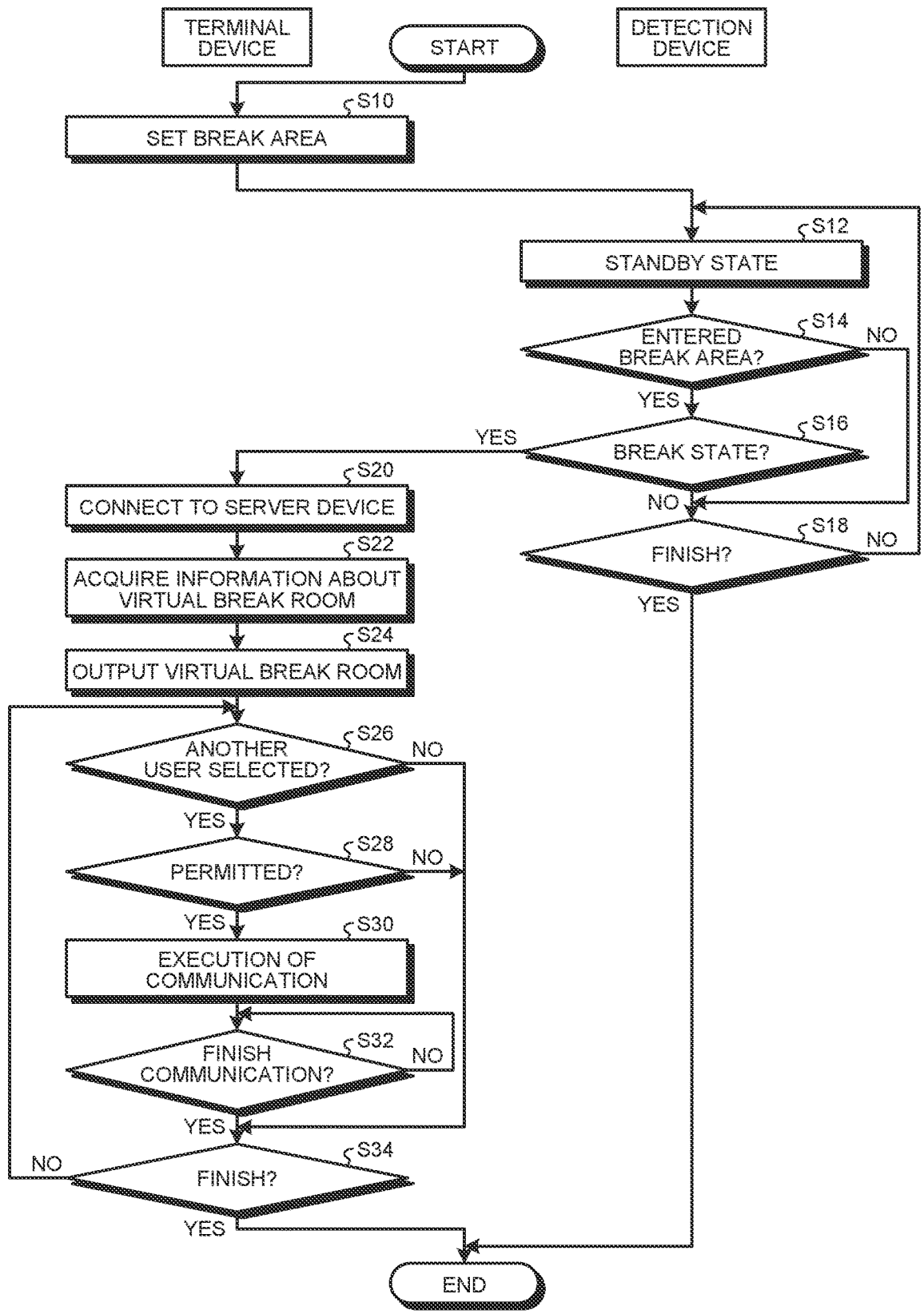
FIG. 5 is a flow chart illustrating a flow of a process of a virtual-break-room providing system according to the first embodiment.

The processing contents of the virtual-break-room providing system according to the first embodiment will be described by using FIG. 5. FIG. 5 is a flow chart illustrating a flow of a process of the virtual-break-room providing system according to the first embodiment.

The process illustrated in FIG. 5 illustrates a process of a case in which a break area is set at home or the like of the user and, when the user enters the break area, the virtual break room is provided.

Figure 6:
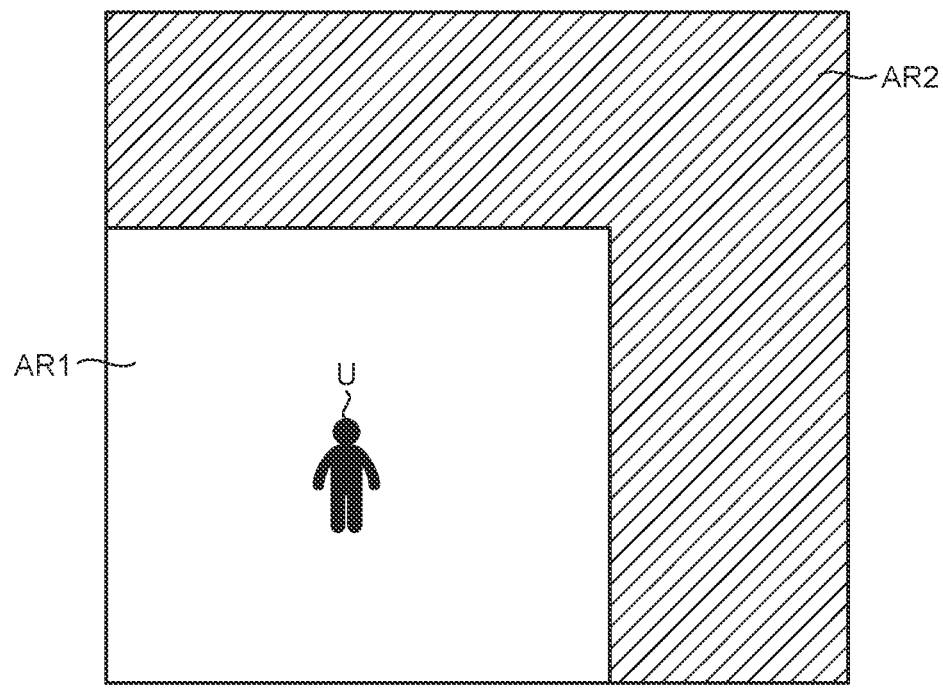
FIG. 6 is a diagram for describing an example of a break area according to the first embodiment.

The terminal device 10 sets a break area, which is for the user to have a break, in real space (step S10). Specifically, the break-area setting unit 40 sets the break area in real space in accordance with the input operation which has been input by the user to the input unit 20. FIG. 6 is a diagram for describing an example of the break area according to the first embodiment. FIG. 6 illustrates a break area AR1 and a non-break area AR2. The break area AR1 is, for example, an area which has been set by the user U at home or the like for the user U to have a break. The non-break area AR2 is a region other than the break area AR1. The break area AR1 may be, for example, a predetermined room or a partial region of a living room or the like. More specifically, the break area AR1 does not have to be the space which is surrounded by a door, wall, etc. The size and the shape of the break area AR1 may be arbitrary. The break-area setting unit 40 may set plural break areas AR1 in accordance with the input operations input by the user U to the input unit 20. Then, the process proceeds to step S12.

The detection device 12 becomes a standby state for detecting entrance of the user U into the break area AR1 (step S12). Then, the process proceeds to step S14.

Figure 7:
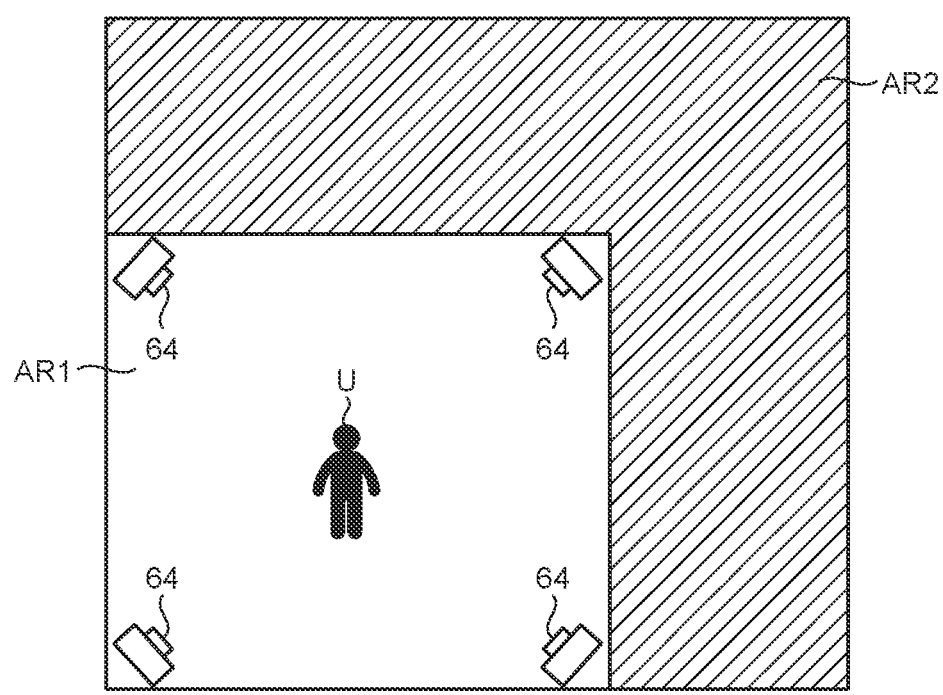
FIG. 7 is a diagram for describing an example of a method of detecting entrance to the break area according to the first embodiment.

The detection device 12 determines whether or not the user U has entered the break area AR1 (step S14). FIG. 7 is a diagram for describing an example of a method of detecting entrance to the break area according to the first embodiment. As illustrated in FIG. 7, for example, position detection sensors 64 are disposed at four corners of the break area AR1. The position detection sensors 64 are cameras which capture images of the user U. In this case, for example, if images of the user U are captured in the break area AR1, the entrance detection unit 82 detects that the user U has entered the break area AR1. The position detection sensors 64 may be human detection sensors which detect the user U or pressure sensors provided at chairs etc. disposed in the break area AR1. In such a case, when the user U sits on the chair on which the pressure sensor is provided, the entrance detection unit 82 can detect that the user U has entered the break area AR1. The number of the position detection sensors 64 disposed for detecting that the user U has entered the break area AR1 may be arbitrary. If it is determined that the user U has entered the break area AR1 (step S14; Yes), the process proceeds to step S16. If it is not determined that the user U has entered the break area AR1 (step S14; No), the process proceeds to step S18.

If it is determined in Yes in step S14, the detection device 12 determines whether or not the user U is in a break state (step S16). Specifically, if the user U is staying or relaxing in the break area AR1 for predetermined time or more (for example, about several seconds to 10 seconds), the entrance detection unit 82 determines the break state. The entrance detection unit 82 can determine whether the user is relaxing or not, for example, by a known method such as image processing based on the captured image of the face of the user U. If the position detection sensor 64 is a pressure sensor provided on a chair or the like, the entrance detection unit 82 may determine that the user U is in the break state when the user U sits on the chair on which the pressure sensor is provided. If it is not determined that the user U is in the break state (step S16; No), the process proceeds to step S18. If it is determined that the user U is in the break state (step S16; Yes), the process proceeds to step S20.

If No is determined in step S14 or step S16, the detection device 12 determines whether or not to finish the process (step S18). Specifically, for example when an operation that finishes the detection process is received, the detection device 12 determines termination of the process. If it is determined that the process is to be finished (step S18; Yes), the process of FIG. 5 is finished. If it is not determined that the process is to be finished (step S18; No), the process proceeds to step S12.

If it is determined Yes in step S16, the terminal device 10 connects to the server device 14 which provides the virtual break room (step S20). Specifically, the virtual-break-room connection unit 42 connects to the server device 14 via the communication unit 30. Then, the process proceeds to step S22.

The terminal device 10 acquires virtual-break-room information (step S22). Specifically, the virtual-break-room-information acquisition unit 44 acquires information about the virtual break room from the server device 14 via the communication unit 30. The information about the virtual break room includes the information for specifying the virtual break room, the information about the number of users who are in the virtual break room, and the information about the users. The information about the virtual break room may include, for example, information such as images and sound of the virtual break room. Then, the process proceeds to step S24.

The terminal device 10 outputs the virtual break room to the display unit 22 (step S24). Specifically, the output control unit 46 causes the display unit 22 to display the virtual break room based on the information about the virtual break room acquired by the virtual-break-room-information acquisition unit 44. If the terminal device 10 is not provided with the display unit 22, the output control unit 46 causes the sound output unit 24 to sound-output the information about the virtual break room. The information about the virtual break room sound-output by the sound output unit 24 includes the information for specifying the virtual break room, the information about the names of the users who are in the virtual break room, and the information of the state of the users in the virtual break room. Herein, the information of the state of the users is, for example, the information that which user is currently having a conversation with which user.

Figure 8:
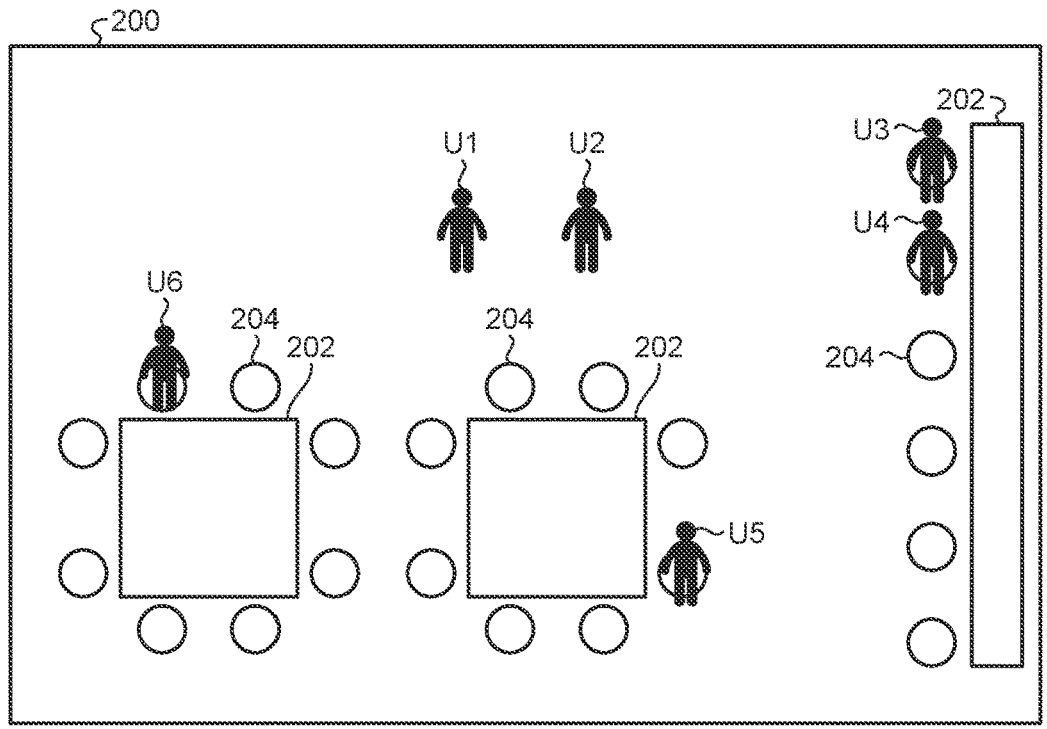
FIG. 8 is a diagram illustrating an example of a virtual break room according to the first embodiment.

An example of the virtual break room according to the first embodiment will be described by using FIG. 8. FIG. 8 is a diagram illustrating the example of the virtual break room according to the first embodiment. As illustrated in FIG. 8, in a virtual break room 200, plural tables 202 and plural chairs 204 are disposed. A user U1, a user U2, a user U3, a user U4, a user U5, and a user U6 are in the virtual break room 200. The user U1 is an icon representing himself/herself. The user U2 to the user U6 are icons representing other users. Names may be displayed above the user U1 to the user U6. The output control unit 46 may display the information showing the number of the people connected to the virtual break room 200. The output control unit 46 may display a list of the names of all the users connecting to the virtual break room 200.

Figure 9:
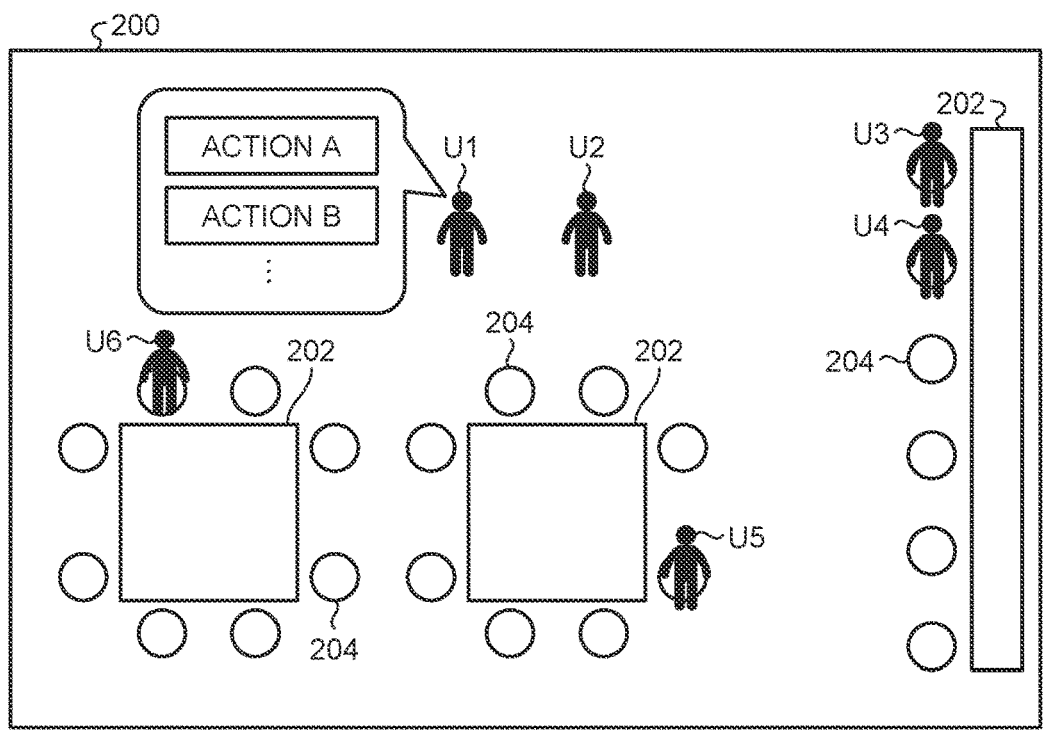
FIG. 9 is a diagram for describing a method of selecting another user according to the first embodiment.

Returning to FIG. 5, the terminal device 10 determines whether or not the user has selected another user (step S26). FIG. 9 is a diagram for describing a method of selecting another user according to the first embodiment. As illustrated in FIG. 9, the communication execution unit 50, for example, determines whether icon(s) of the counterpart to communicate with among the user U2 to the user U6 has been selected or not. For example, if the input unit 20 is a touch screen disposed on the display unit 22, the user can select the counterpart of communication by touching the icons of the user U2 to the user U6. The selected communication counterpart(s) may be single or plural. Before the counterpart of communication among the user U2 to the user U6 is selected, a predetermined gesture may be carried out. For example, in the example illustrated in FIG. 9, selection buttons of an action A and an action B may be displayed in the left side of the user U1. In such a case, for example, the user U1 may be configured to carry out an action of waving his/her hand to the user U2 when the action A is selected. For example, the user U1 may be configured to carry out an action of talking to the user U2 for example by saying "hello" when the action B is selected. If it is determined that the user has selected another user (step S26; Yes), the process proceeds to step S28. If it is not determined that the user has selected another user (step S26; No), the process proceeds to step S34.

If Yes is determined in step S26, the terminal device 10 determines whether communication has been permitted by the selected other user(s) (step S28). If it is determined that communication has been permitted by the other user (step S28; Yes), the process proceeds to step S30. If it is not determined that communication has been permitted from the other user (step S28; No), the process proceeds to step S34.

If Yes is determined in step S28, the communication execution unit 50 starts execution of communication (step S30). Specifically, in the example illustrated in FIG. 9, if communication with the user U2 is to be started, communication may be started at that place, or the user may move to the nearby chair 204 and start communication. For example, if communication with the user U5 or the user U6 is to be started, the user may move to the chair 204 near the user U5 or the user U6 and start communication, or the user U5 or the user U6 may come close to the user and start communication. For example, if communication with two users, i.e., the user U3 and the user U4 is to be started, since the counterpart has a larger number of people, the user moves to the chair 204 near the user U3 and the user U4 and starts communication. The communication may be a call using sound or may be a chat using a chat tool. Then, the process proceeds to step S32.

The terminal device 10 determines whether or not the communication has been finished (step S32). Specifically, the communication execution unit 50 determines whether the communication started in step S30 has been finished or not. If it is determined that the communication has been finished (step S32; Yes), the process proceeds to step S34. If it is not determined that the communication has been finished (step S32; No), the process of step S32 is repeated.

If it is determined No in step S26, No in step S28, or Yes in step S32, the terminal device 10 determines whether or not to finish the process (step S34). Specifically, for example when the user leaves the virtual break room 200, the terminal device 10 determines to finish the process. If it is determined to finish the process (step S34; Yes), the process of FIG. 5 is finished. If it is not determined to finish the process (step S34; No), the process proceeds to step S26.

As described above, in the first embodiment, if it is determined that the user has entered the break area set in advance and that the user is in a break state, the virtual break room is automatically provided to the user. Even in a telework environment or the like, the user can appropriately communicate with other users in the virtual break room. By virtue of this, in the first embodiment, lack of communication in a telework environment or the like can be solved.

First Modification Example of First Embodiment

A first modification example of the first embodiment will be described. The first embodiment has been described to connect to the virtual break room when the user is detected in the break area. In the first modification example of the first embodiment, before the virtual break room is provided to the user, it is determined whether the user is a user registered in advance.

Since a configuration of a virtual-break-room providing system according to the first modification example of the first embodiment is the same as the configuration of the virtual-break-room providing system illustrated in FIG. 1, the descriptions thereof will be omitted.

Process of Virtual-Break-Room Providing System

Figure 10:
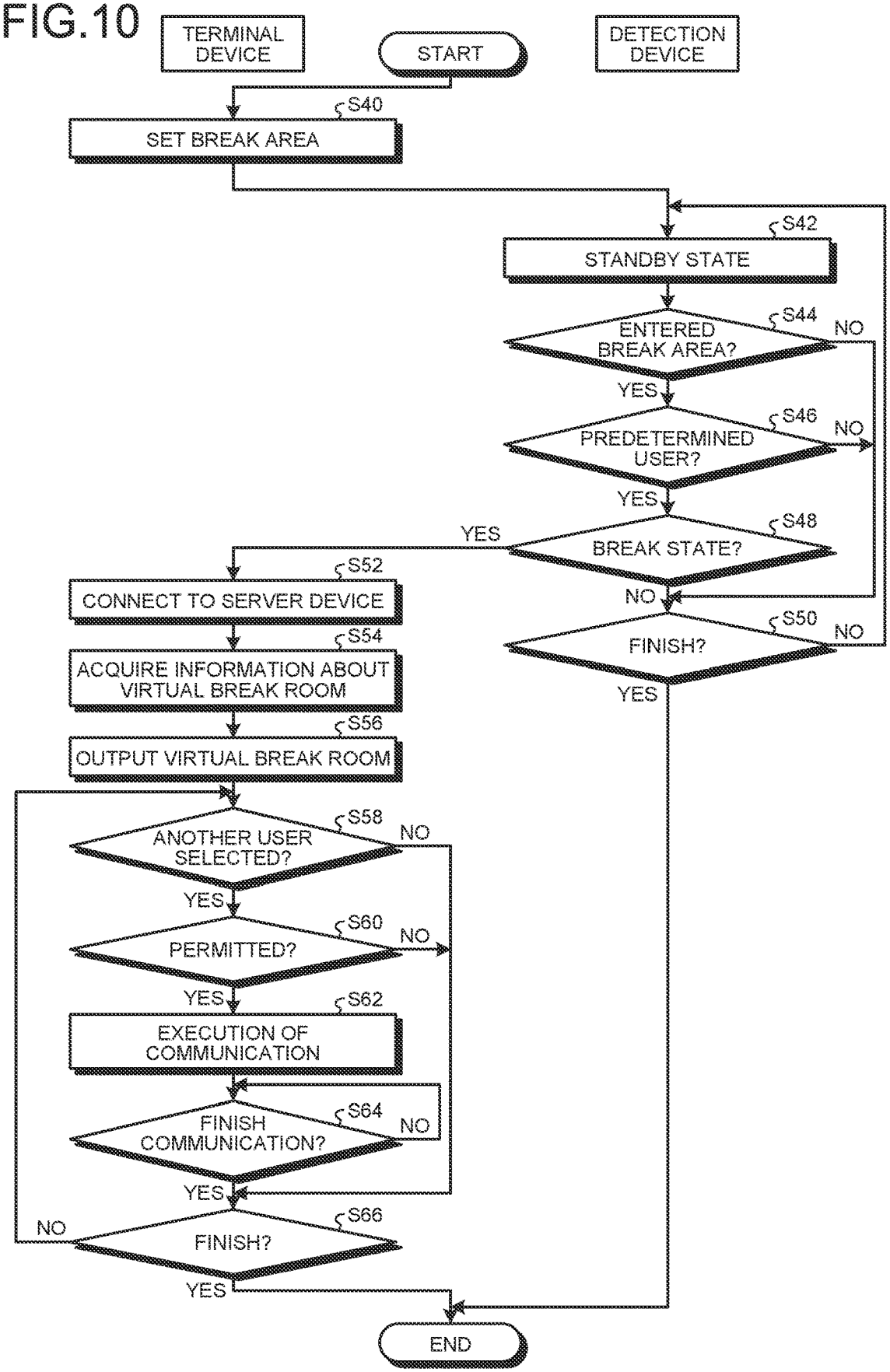
FIG. 10 is a flow chart illustrating a flow of a process of a virtual-break-room providing system according to a first modification example of the first embodiment.

Processing contents of the virtual-break-room providing system according to the first modification example of the first embodiment will be described by using FIG. 10. FIG. 10 is a flow chart illustrating a flow of the process of the virtual-break-room providing system according to the first modification example of the first embodiment.

The processes of step S40 to step S44 are the same as the processes of step S10 to step S14 illustrated in FIG. 5. Therefore, the descriptions thereof are omitted.

If it is determined Yes in step S44, the detection device 12 determines whether or not the user who has entered the break area is a predetermined user (step S46). Specifically, the determination unit 86 determines whether the user who has entered the break area is the registered user to whom the virtual break room is to be provided. In this case, for example, identification information including the image of the face of the user to whom the virtual break room is to be provided can be stored in the storage unit 66. For example, if the position detection sensor 64 is a camera, the determination unit 86 determines whether or not the user who has entered the break area is the predetermined user by comparing the image of the face of the user detected by the position detection sensor 64 in the break area with the identification information stored in the storage unit 66. If it is determined that the user who has entered the break area is the predetermined user (step S46; Yes), the process proceeds to step S48. If it is not determined that the user who has entered the break area is the predetermined user (step S46; No), the process proceeds to step S50.

The processes of step S48 to step S66 are the same as the processes of step S16 to step S34 illustrated in FIG. 5. Therefore, the descriptions thereof are omitted.

As described above, the first modification example of the first embodiment provides the virtual break room to the user only when it is determined that the user is the user registered in advance. By virtue of this, the first modification example of the first embodiment can provide the virtual break room more appropriately since providing the virtual break room to a wrong user can be prevented.

Second Modification Example of First Embodiment

A second modification example of the first embodiment will be described. The first embodiment has been described to automatically connect to the virtual break room when it is determined that the user is in the break state in the break area. In the second modification example of the first embodiment, before the virtual break room is provided to the user, whether or not to connect to the virtual break room is confirmed.

The configuration of a virtual-break-room providing system according to the second modification example of the first embodiment is the same as the configuration of the virtual-break-room providing system illustrated in FIG. 1. Therefore, the descriptions thereof are omitted.

Process of Virtual-Break-Room Providing System

Figure 11:
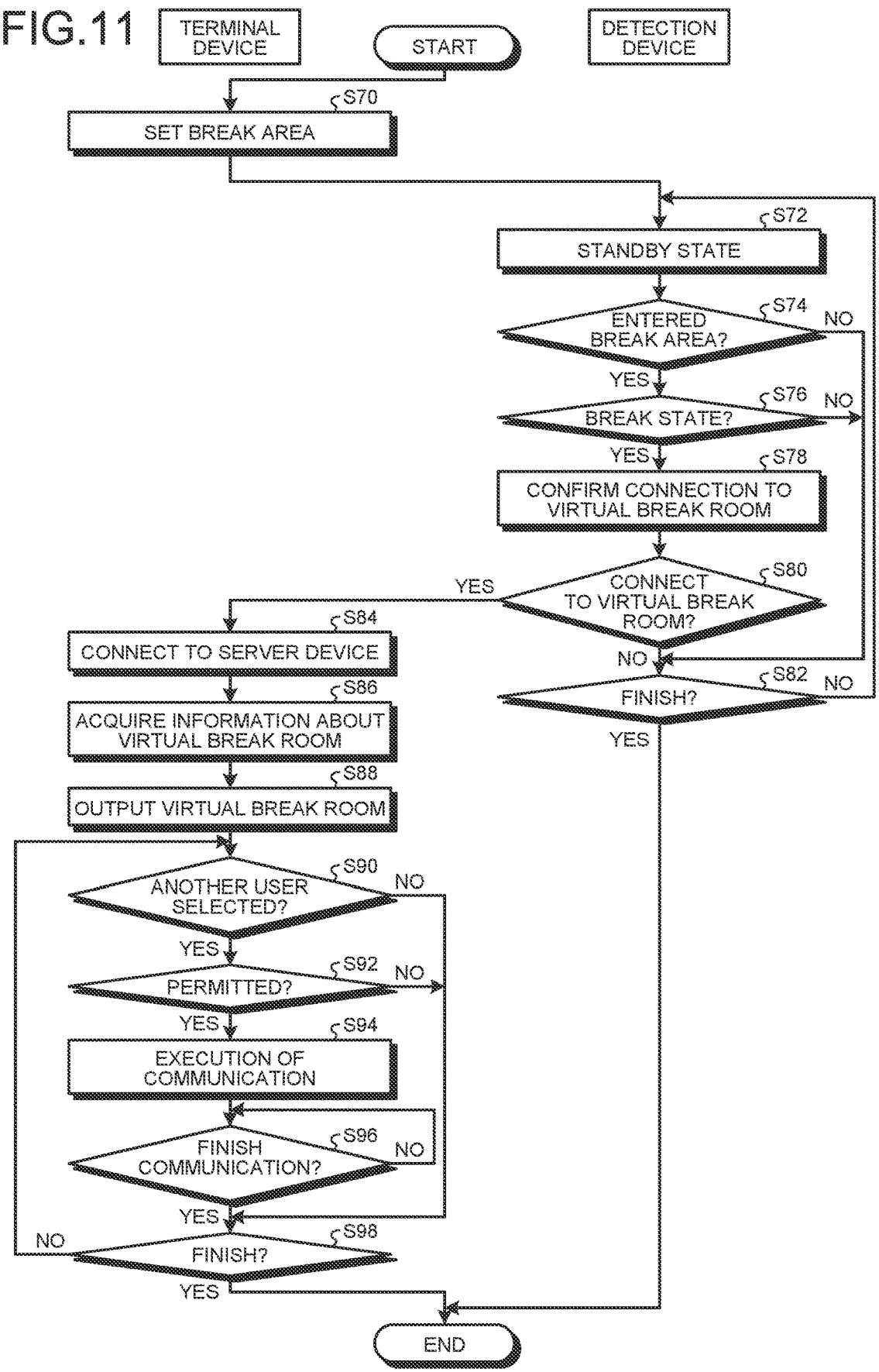
FIG. 11 is a flow chart illustrating a flow of a process of a virtual-break-room providing system according to a second modification example of the first embodiment.

Processing contents of the virtual-break-room providing system according to the second modification example of the first embodiment will be described by using FIG. 11. FIG. 11 is a flow chart illustrating a flow of the process of the virtual-break-room providing system according to the second modification example of the first embodiment.

The processes of step S70 to step S76 are the same as the processes of step S10 to step S16 illustrated in FIG. 5. Therefore, the descriptions thereof are omitted.

Figure 12:
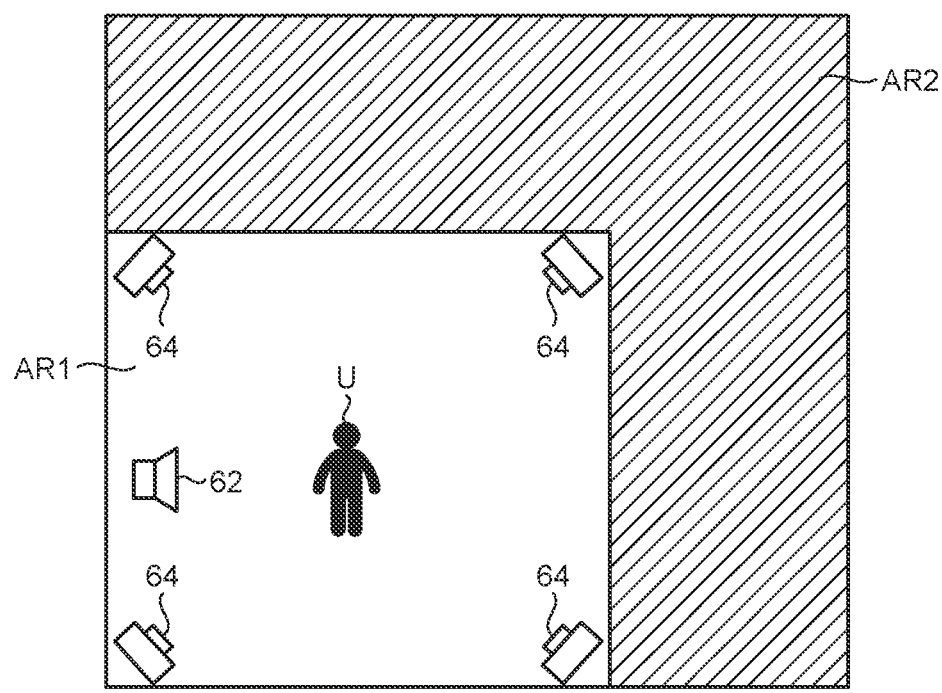
FIG. 12 is a diagram for describing a method of confirming whether or not to connect to a virtual break room according to the second modification example of the first embodiment.

If Yes is determined in step S76, the detection device 12 asks the user whether or not to connect to the virtual break room (step S78). FIG. 12 is a diagram for describing a method of confirming whether or not to connect to the virtual break room according to the second modification example of the first embodiment. The confirmation unit 84, for example, asks the user U whether or not to connect to the virtual break room by outputting sound such as "Do you want to connect to the virtual break room?" from the sound output unit 62. The confirmation unit 84 may output, by the sound output unit 62, the information about the number of people connecting to the virtual break room such as "X people are connecting to the virtual break room. Do you want to connect to the virtual break room?". The confirmation unit 84 may output, by the sound output unit 62, the information that particular people such as friends, co-workers, bosses, etc. are connecting to the break room such as "A is connecting to the virtual break room. Do you want to connect to the virtual break room?". In a residence environment, plural sound output units 62 may be disposed. If the plural sound output units 62 are disposed, the information may be output only from the sound output unit 62 which is at a position closest to the user U. Then, the process proceeds to step S80.

The detection device 12 determines whether or not to connect to the virtual break room (step S80). Specifically, for example when the voice of the user U such as "Yes. Please connect to the virtual break room." is detected by the input unit 60, the determination unit 86 determines to connect to the virtual break room. For example, when the voice of the user U such as "No. Please do not connect to the virtual break room." is detected by the input unit 60, the determination unit 86 determines not to connect to the virtual break room. The user can select whether or not to connect to the virtual break room based on the various information output in step S78. If it is not determined to connect to the virtual break room (step S80; No), the process proceeds to step S82. If it is determined to connect to the virtual break room (step S80; Yes), the process proceeds to step S84.

The processes of step S82 to step S98 are the same as the processes of step S18 to step S34 illustrated in FIG. 5. Therefore, the descriptions thereof are omitted.

As described above, in the second modification example of the first embodiment, the virtual break room is provided to the user only when the user wants to connect to the virtual break room. By virtue of this, the second modification example of the first embodiment can more appropriately provide the virtual break room to the user.

Second Embodiment

Figure 13:
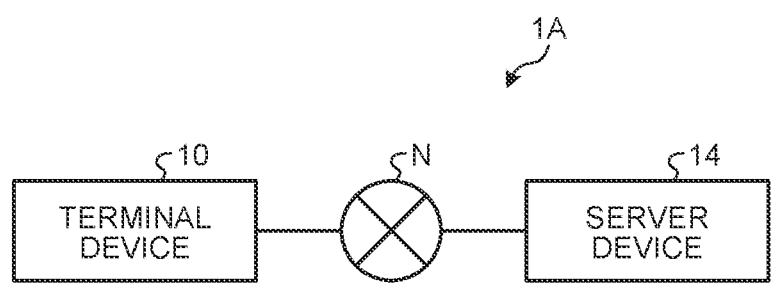
FIG. 13 is a diagram illustrating a configuration of a virtual-break-room providing system according to a second embodiment.

A configuration example of a virtual-break-room providing system according to the second embodiment will be described by using FIG. 13. FIG. 13 is a diagram illustrating the configuration of the virtual-break-room providing system according to the second embodiment.

As illustrated in FIG. 13, a virtual-break-room providing system 1A includes the terminal device 10 and the server device 14. The virtual-break-room providing system 1A is different from the virtual-break-room providing system 1 illustrated in FIG. 1 in a point that the detection device 12 is not included.

The virtual-break-room providing system 1A provides the virtual break room to the user when the user is at a facility or a location set as a break area such as a restaurant, a cafe, or a park.

Process of Virtual-Break-Room Providing System

Figure 14:
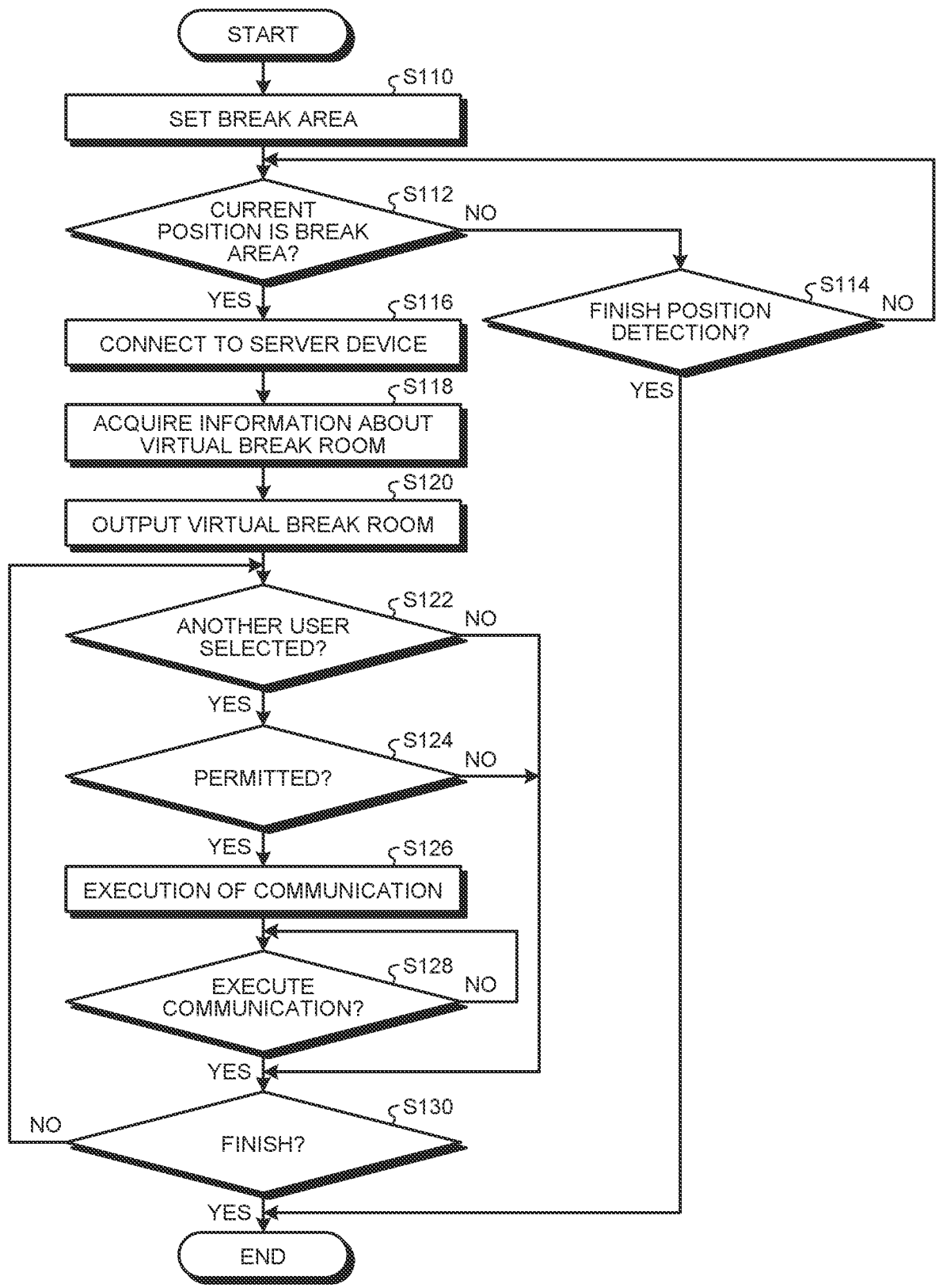
FIG. 14 is a flow chart illustrating a flow of a process of the virtual-break-room providing system according to the second embodiment.

The processing contents of the virtual-break-room providing system according to the second embodiment will be described by using FIG. 14. FIG. 14 is a flow chart illustrating a flow of the process of the virtual-break-room providing system according to the second embodiment.

The terminal device 10 sets, in real space, the break area for the user to have a break (step S110). Specifically, the break-area setting unit 40 inputs the position information of a facility such as a cafe as a break area in accordance with an input operation input to the input unit 20 by the user. The break-area-setting unit 40 may set the break area, for example, depending on time slots. The break-area setting unit 40 may set, for example, a cafe near the user's home as the break area between 8:00 and 10:00, but set the cafe as a non-break area in other time slots. The break-area setting unit 40 may set plural facilities as break areas. Then, the process proceeds to step S112.

The terminal device 10 determines whether or not the current position is the break area (step S112). Specifically, if the position information calculated based on the GNSS signal acquired from the GNSS reception unit 28 is the break area set in step S80, the position-information acquisition unit 48 determines that the current position is the break area. If it is determined that the current position is not the break area (step S112; No), the process proceeds to step S114. If it is determined that the current position is the break area (step S112; Yes), the process proceeds to step S116.

If No is determined in step S112, the terminal device 10 determines whether or not to finish the position detection of the current position (step S114). Specifically, in a case in which an operation to turn off power is received, the terminal device 10 determines to finish the position detection of the current position when an operation to finish the position detection of the current position is received. If it is determined to finish the position detection of the current position (step S114; Yes), the process of FIG. 14 is finished. If it is not determined to finish the position detection of the current position (step S114; No), the process proceeds to step S112.

The processes of step S116 to step S130 are the same as the processes of step S20 to step S34 illustrated in FIG. 5. Therefore, the descriptions thereof are omitted.

As described above, in the second embodiment, the virtual break room is provided to the user when it is determined that the user is at the break area such as a cafe set in advance. By virtue of this, the second embodiment can solve lack of communication in a case in which the user is, for example, out in a telework environment.

Modification Example of Second Embodiment

The second embodiment has been described to provide the virtual break room to the user based on the current position information, for example, in a case in which the user is out. In the present disclosure, it is not limited to the case in which the user is out, but even in a case in which the user is teleworking at home, whether or not the user is positioned in the break area may be determined based on the current position of the user.

For example, in the example illustrated in FIG. 6 etc., the terminal device 10 may determine whether the user U is positioned in the break area AR1 or positioned in the non-break area AR2 may be determined. In such a case, the position-information acquisition unit 48 may determine whether the user U is positioned in the break area AR1 or positioned in the non-break area AR2, for example, based on the GNSS signal received from the GNSS reception unit 28. The position-information acquisition unit 48 may determine whether the user U is positioned in the break area AR1 or positioned in the non-break area AR2, for example, by using a known indoor positioning technique such as a beacon and Wi-Fi (registered tradename). The position-information acquisition unit 48 may determine whether the user U is positioned in the break area AR1 or positioned in the non-break area AR2 by combining the position detection using the GNSS signal and an indoor positioning technique.

Third Embodiment

A third embodiment will be described. The third embodiment changes the provided virtual break room depending on the break area where the user is having a break.

Figure 15:
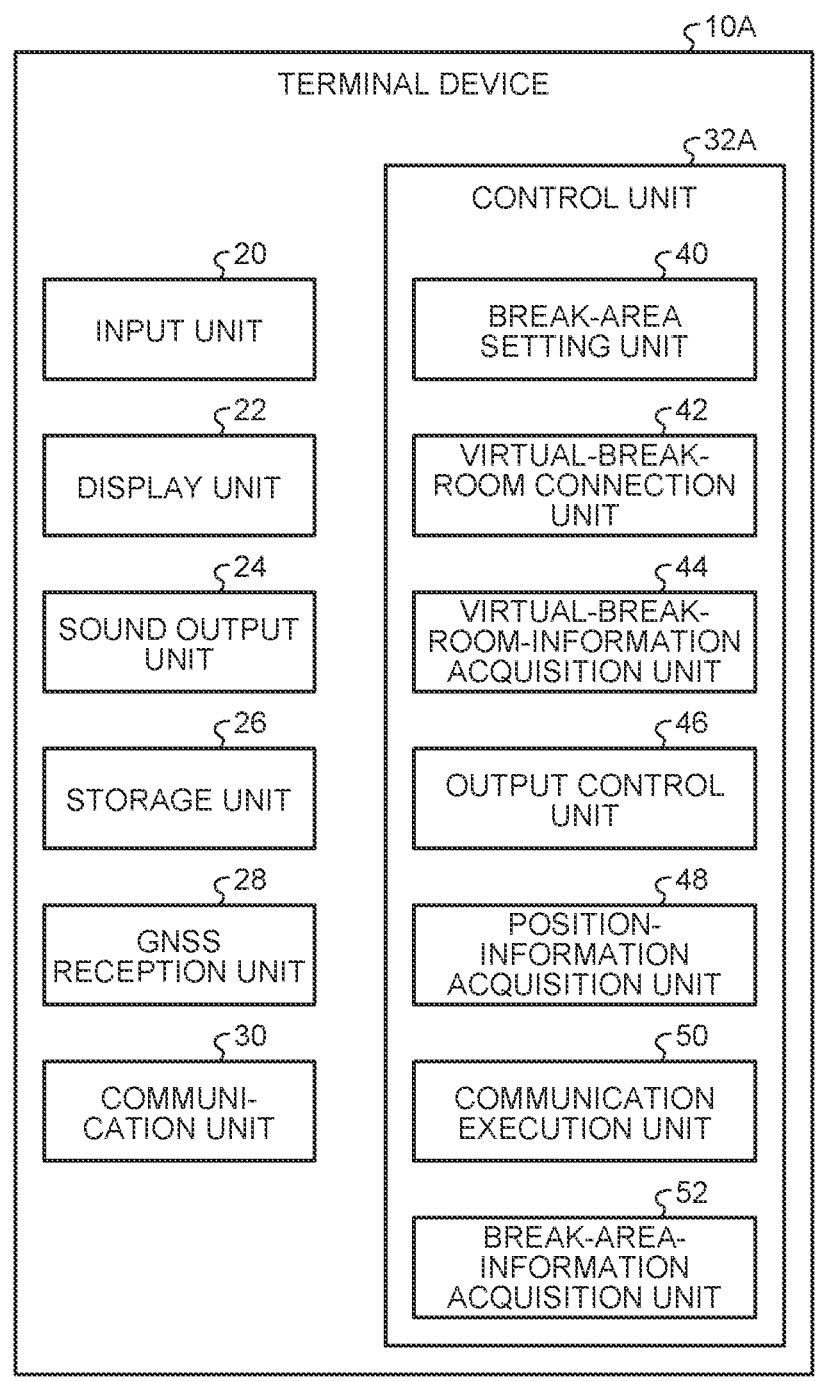
FIG. 15 is a block diagram illustrating a configuration example of a terminal device according to a third embodiment.

A configuration example of a terminal device according to the third embodiment will be described by using FIG. 15. FIG. 15 is a block diagram illustrating the configuration example of the terminal device according to the third embodiment.

The configuration of the virtual-break-room providing system according to the third embodiment has a configuration similar to that of the virtual-break-room providing system 1 illustrated in FIG. 1 or the virtual-break-room providing system 1A illustrated in FIG. 13. Therefore, the descriptions thereof are omitted.

As illustrated in FIG. 15, a terminal device 10A is different from the terminal device 10 and the control unit 32 illustrated in FIG. 2 in a point that a control unit 32A is provided with a break-area-information acquisition unit 52.

When the user is having a break in a break area, the break-area-information acquisition unit 52 acquires the information about the break area where the user is having the break. The information about the break area includes the information about the location of the break area. The information about the location of the break area includes specific information, for example, that the break area is a room of the user or a cafe. For example, if the break area is the user's home, the break-area-information acquisition unit 52 acquires the information about the break area from the detection device 12. For example, if the break area is an outside location such as a cafe, the break-area-information acquisition unit 52 acquires the information about the break area based on the current position information. For example, when the information about the break area is to be acquired based on the current position information, if the current position is a commercial facility such as a cafe, the break-area-information acquisition unit 52 may acquire shop information about the commercial facility. The commercial-facility information may include, for example, layout information of seats, interior, etc.

Virtual-Break-Room Changing Process

Figure 16:
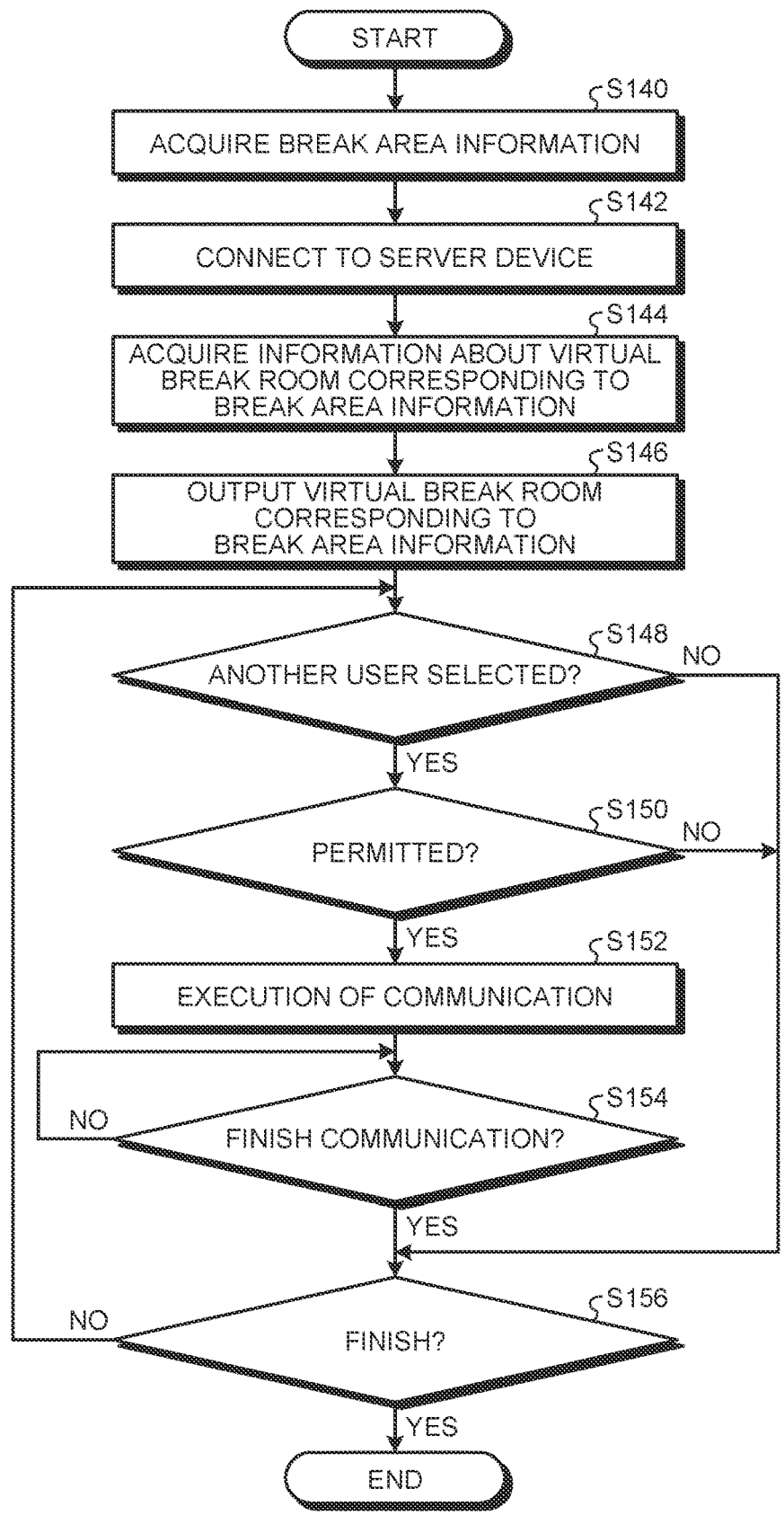
FIG. 16 is a flow chart illustrating a flow of a virtual-break-room changing process according to the third embodiment.

The contents of a virtual-break-room changing process according to the third embodiment will be described by using FIG. 16. FIG. 16 is a flow chart illustrating the flow of the virtual-break-room changing process according to the third embodiment.

FIG. 16 illustrates the process executed after it is determined that the user is having a break in the break area.

The terminal device 10A acquires the break area information (step S140). Specifically, for example, if the break area is the user's home, the break-area-information acquisition unit 52 acquires the information about the break area from the detection device 12. For example, if the break area is an outside location such as a cafe, the break-area-information acquisition unit 52 acquires the information about the break area based on the current position information. Then, the process proceeds to step S142.

The process of step S142 is the same as the process of step S20 illustrated in FIG. 5. Therefore, the descriptions thereof are omitted.

The virtual-break-room-information acquisition unit 44 of the terminal device 10A acquires the information about the virtual break room corresponding to the break area information (step S144). Specifically, for example, if the break area information shows that it is the home or the room of the user, the virtual-break-room-information acquisition unit 44 acquires the information about the virtual break room corresponding to the home or the room. For example, if the break area information is an outside location such as a cafe, the virtual-break-room-information acquisition unit 44 acquires the information about the virtual break room corresponding to the outside location such as the cafe. Then, the process proceeds to step S146.

Figure 17:
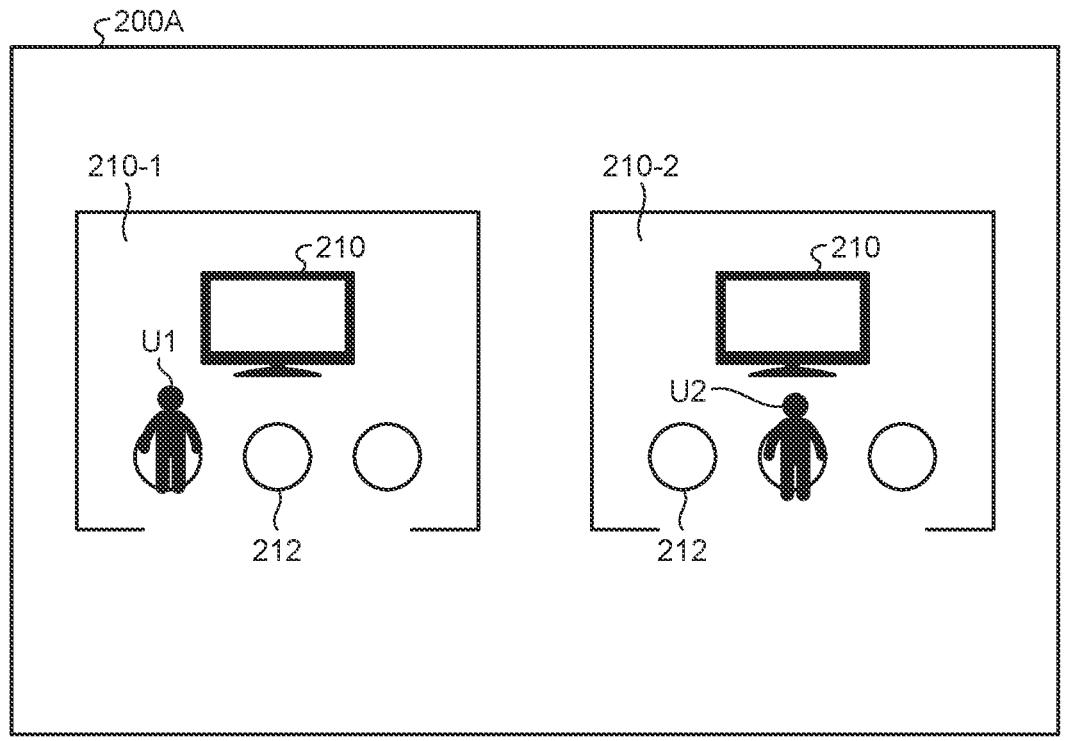
FIG. 17 is a diagram for describing a method of displaying a virtual break room corresponding to break area information according to the third embodiment.
Figure 18:
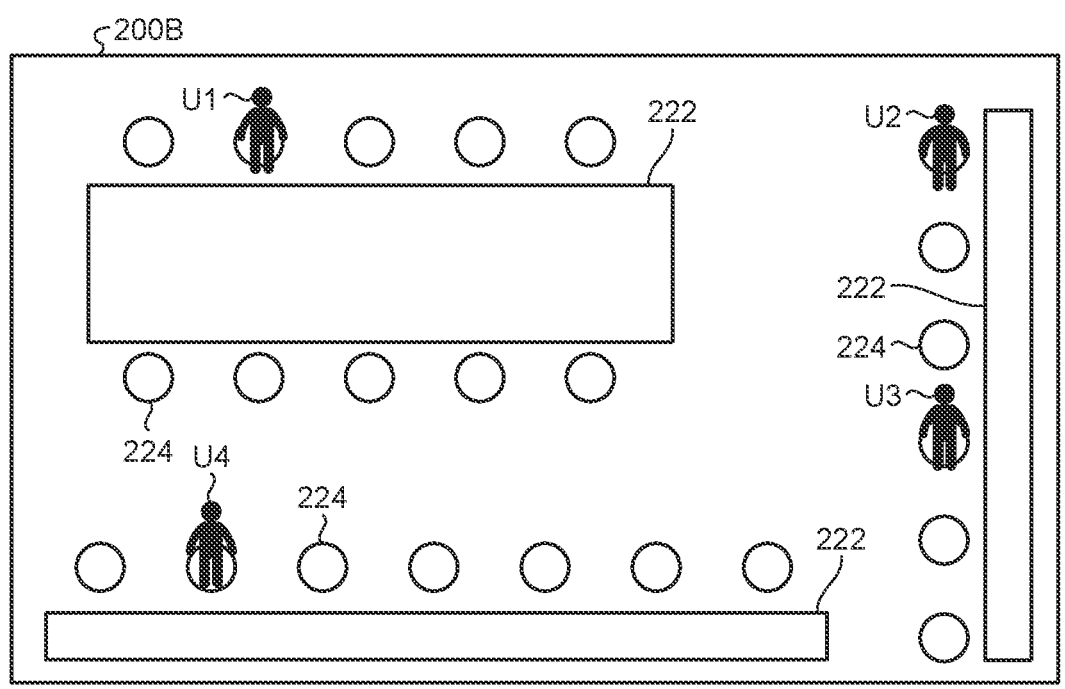
FIG. 18 is a diagram for describing a method of displaying the virtual break room corresponding to the break area information according to the third embodiment.

The output control unit 46 of the terminal device 10A outputs the virtual break room, which is corresponding to the break area information, to the display unit 22 (step S146). FIG. 17 and FIG. 18 are diagrams for describing a method of displaying the virtual break room, which is corresponding to the break area information, according to the third embodiment.

A virtual break room 200A illustrated in FIG. 17 is a virtual break room corresponding to the home or a room of the user. More specifically, if the user is having a break in his/her room, the virtual break room 200A is displayed by the display unit 22. The virtual break room 200A includes a user room area 210-1 and a user room area 210-2. The user room area 210-1 and the user room area 210-2 are the areas imitating the user's room. In each of the user room area 210-1 and the user room area 210-2, a television 210 and plural seats 212 are disposed. In the user room area 210-1, a user U1, which is an icon of the user is positioned. A user U2, which is an icon of another user, is positioned in the user room area 210-2. In this case, the virtual break room 200A is displayed also by the display unit 22 of the terminal device 10A of the other user. In other words, the virtual break room 200A is shared among the users who are having breaks in their rooms. Therefore, in the virtual break room 200A, the users who are having breaks in their rooms can communicate with one another.

A virtual break room 200B illustrated in FIG. 18 is a virtual break room corresponding to a cafe. More specifically, when the user is having a break in the cafe, the virtual break room 200B is displayed by the display unit 22. The virtual break room 200B includes plural tables 222 and plural seats 224. The user U1 which is the icon of the user and the user U2, a user U3, and a user U4 which are icons of other users are in the virtual break room 200B. In this case, the virtual break room 200B is displayed also by the display units 22 of the terminal devices 10A of the other users. In other words, the virtual break room 200B is supplied to the users who are having a break in the cafe. The virtual break room 200B may change the disposition of the plural tables 222 and the seats 224 depending on the layout information of a cafe or the like where the user is actually having a break. In the virtual break room 200B, for example, if the user U2 always sits on the same seat 224, the information about that may be displayed. Therefore, in the virtual break room 200B, the users having a break in the cafe can communicate with each other.

In a case in which the virtual break room 200A is displayed by the display unit 22 while the user is having a break in his/her room, it is not necessarily required to communicate only between the users who are having breaks in their rooms. In a case in which the virtual break room 200B is displayed by the display unit 22 while the user is having a break in a cafe, it is not necessarily required to communicate only between the users who are having breaks in the cafe. For example, the virtual break room 200A is displayed by the display unit 22 of the terminal device 10A of the user U1, and the virtual break room 200B is displayed by the display unit 22 of the terminal device 10A of a certain user U2 who is another user; in this state, the user U1 and the user U2 may be able to communicate with each other.

For example, if the user is having a break on a balcony of his/her home, the virtual-break-room-information acquisition unit 44 may acquire the information of the corresponding virtual break room. In this case, the output control unit 46 may cause the display unit 22 to display a hammock or an outdoor chair as a seat. The virtual-break-room-information acquisition unit 44 may acquire the information of the virtual break room which is, for example, corresponding to a case in which the user is having a break in a car. In such a case, the output control unit 46 may cause the display unit 22 to display inside of the car.

Returning to FIG. 16, step S148 to step S156 are the same as the processes of step S26 to step S34 of FIG. 5. Therefore, descriptions thereof are omitted.

As described above, the third embodiment provides the virtual break room corresponding to the break area where the user is actually having a break. By virtue of this, the third embodiment enables the user to communicate with other users in the virtual break room as if the user is having the break in real space.

Fourth Embodiment

A fourth embodiment will be described. The fourth embodiment is a system which provides a virtual break room to the user when the user moves between areas along a flow line, which is set in advance between the predetermined areas. The configuration of the virtual-break-room providing system according to the fourth embodiment is the same as the configuration of the virtual-break-room providing system illustrated in FIG. 1. Therefore, the descriptions thereof are omitted.

Terminal Device

Figure 19:
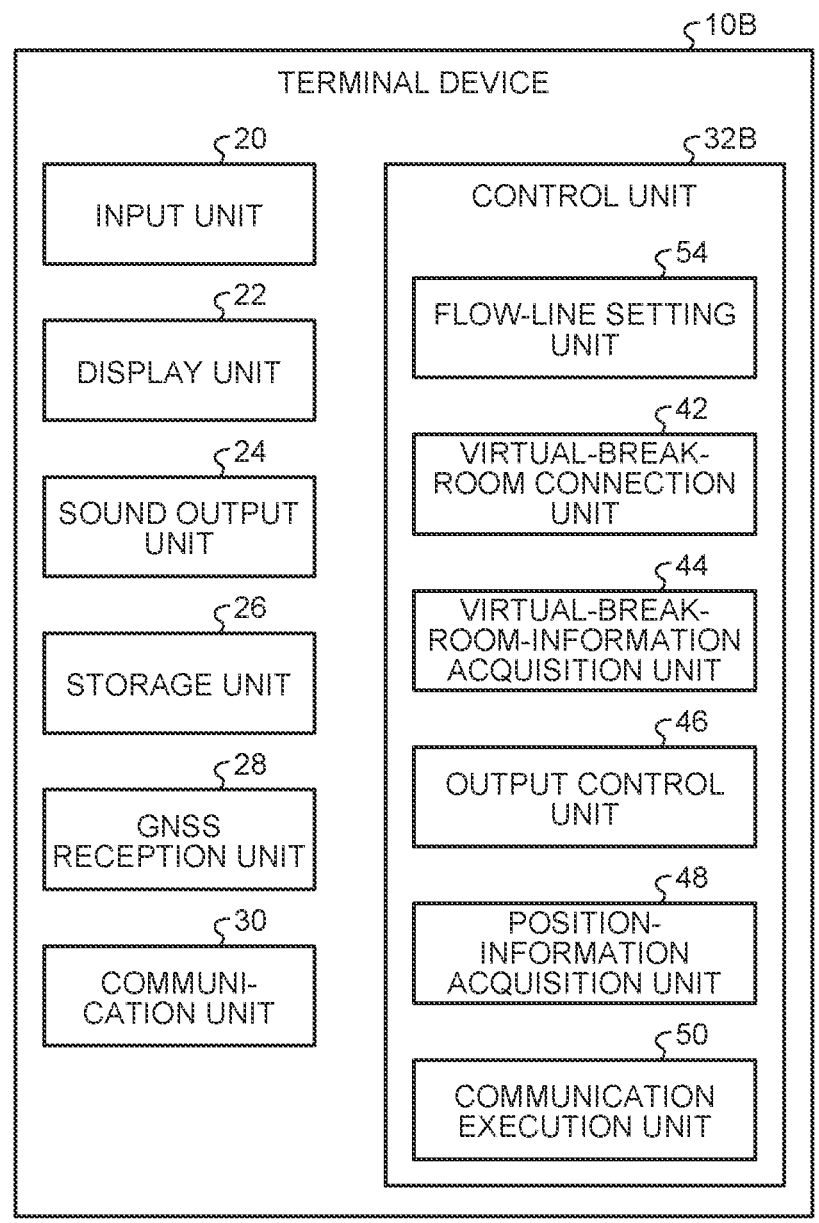
FIG. 19 is a block diagram illustrating a configuration example of a terminal device according to a fourth embodiment.

A configuration example of a terminal device according to the fourth embodiment will be described by using FIG. 19. FIG. 19 is a block diagram illustrating the configuration example of the terminal device according to the fourth embodiment.

As illustrated in FIG. 19, a terminal device 10B is different from the terminal device 10 illustrated in FIG. 2 in the points that a control unit 32B is provided with a flow-line setting unit 54 and that the break-area setting unit 40 is not provided.

The flow-line setting unit 54 sets a flow line showing a track of the movement of the user between predetermined areas. The flow-line setting unit 54 may set the flow line in accordance with operation of the user or may automatically set a guide line. Details of the flow-line setting unit 54 will be described later.

Figure 20:
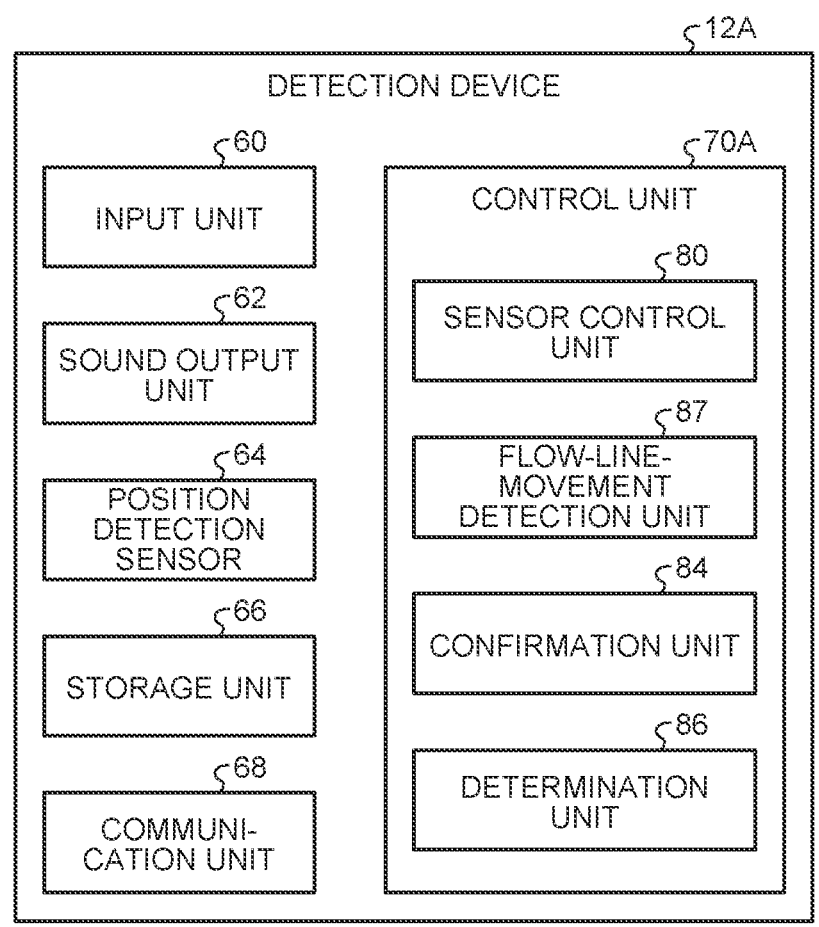
FIG. 20 is a block diagram illustrating a configuration example of a detection device according to the fourth embodiment.

Detection Device A configuration example of a detection device according to the fourth embodiment will be described by using FIG. 20. FIG. 20 is a block diagram illustrating the configuration example of the detection device according to the fourth embodiment.

As illustrated in FIG. 20, a detection device 12A is different from the detection device 12 illustrated in FIG. 3 in the points that a control unit 70A is provided with a flow-line-movement detection unit 87 and that the entrance detection unit 82 is not provided.

The flow-line-movement detection unit 87 detects the movement of the user along a flow line set in advance between predetermined areas. Hereinafter, the flow-line-movement detection unit 87 may be referred to as a detection unit. Based on the detection result of the position of the user by the position detection sensor 64, the flow-line-movement detection unit 87 detects whether the user has moved along the flow line set in advance. Details of the flow-line-movement detection unit 87 will be described later.

Processing Contents of Virtual-Break-Room Providing System

Figure 21:
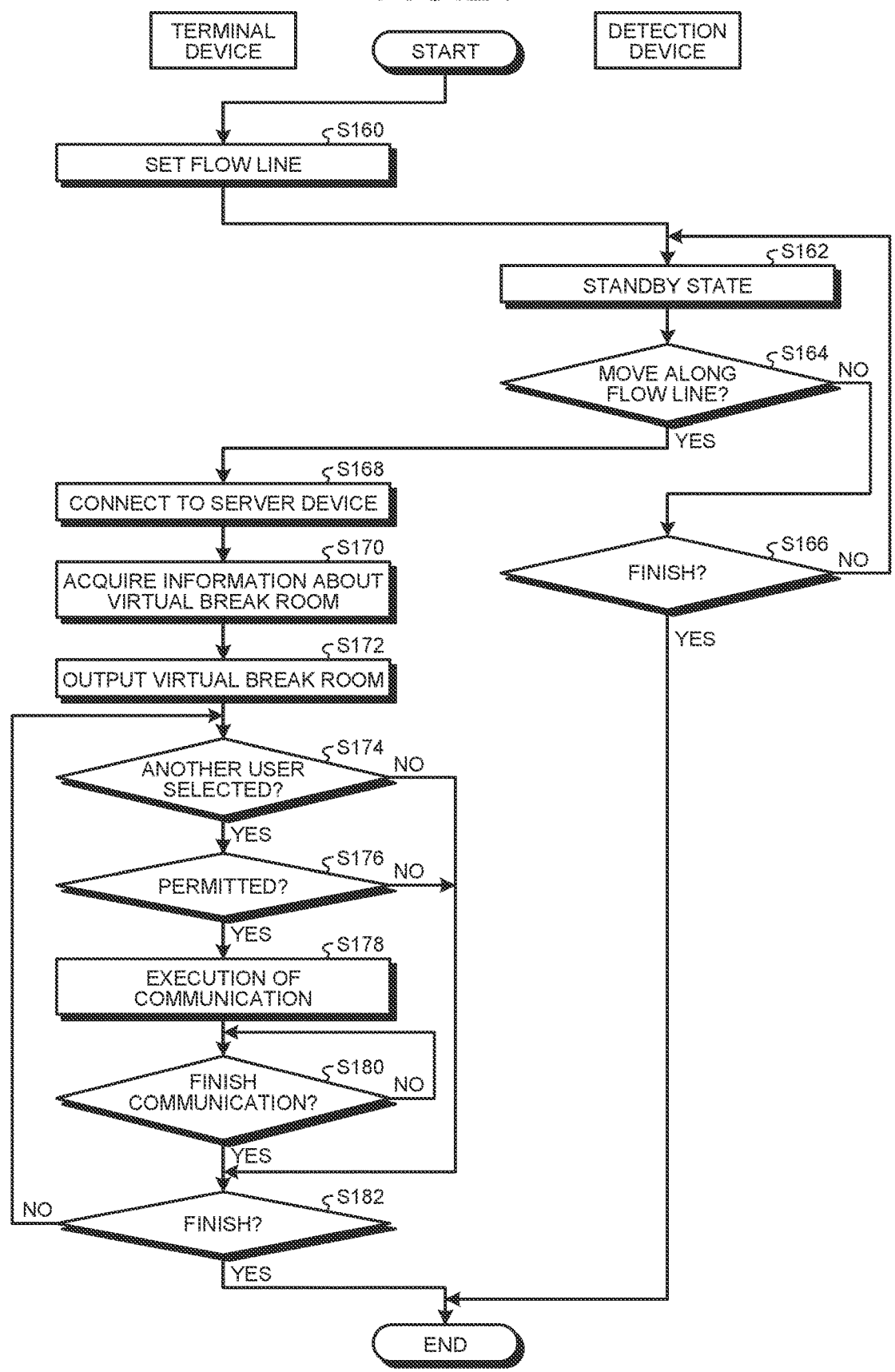
FIG. 21 is a flow chart illustrating a flow of a process of a virtual-break-room providing system according to the fourth embodiment.

The processing contents of the virtual-break-room providing system according to the fourth embodiment will be described by using FIG. 21. FIG. 21 is a flow chart illustrating the flow of the process of the virtual-break-room providing system according to the fourth embodiment.

The process illustrated in FIG. 21 illustrates a process of a case in which the virtual break room is provided when the user moves along a flow line set in advance.

Figure 22:
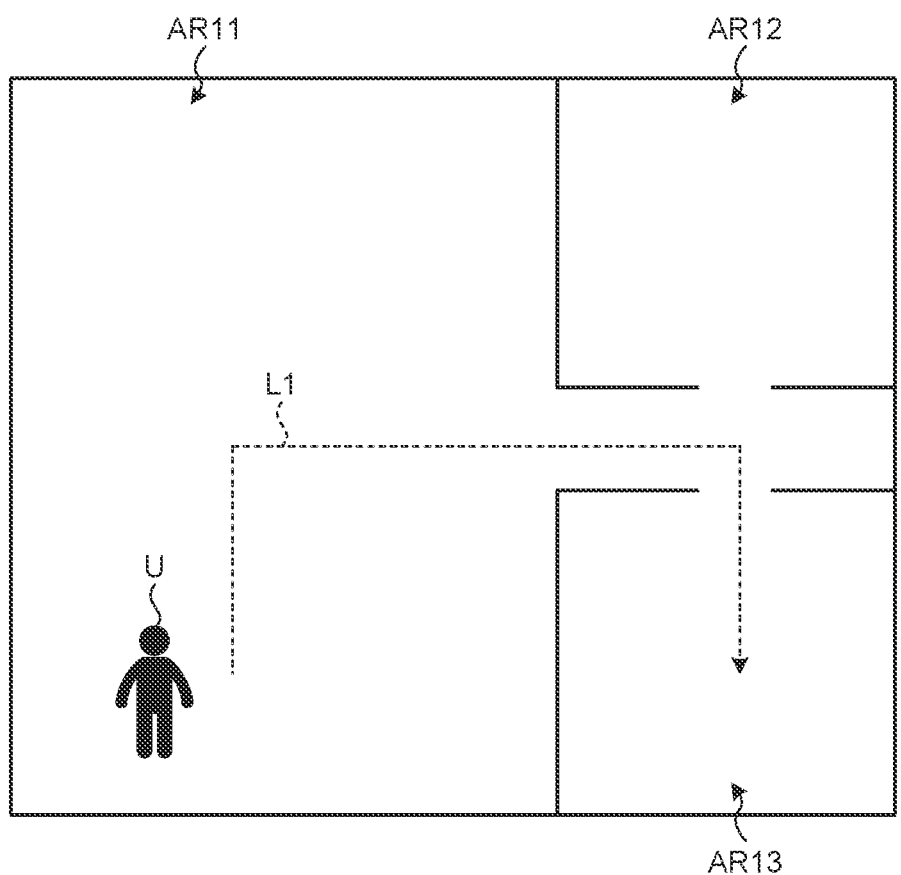
FIG. 22 is a diagram for describing an example of a method of setting a flow line according to the fourth embodiment.
Figure 23:
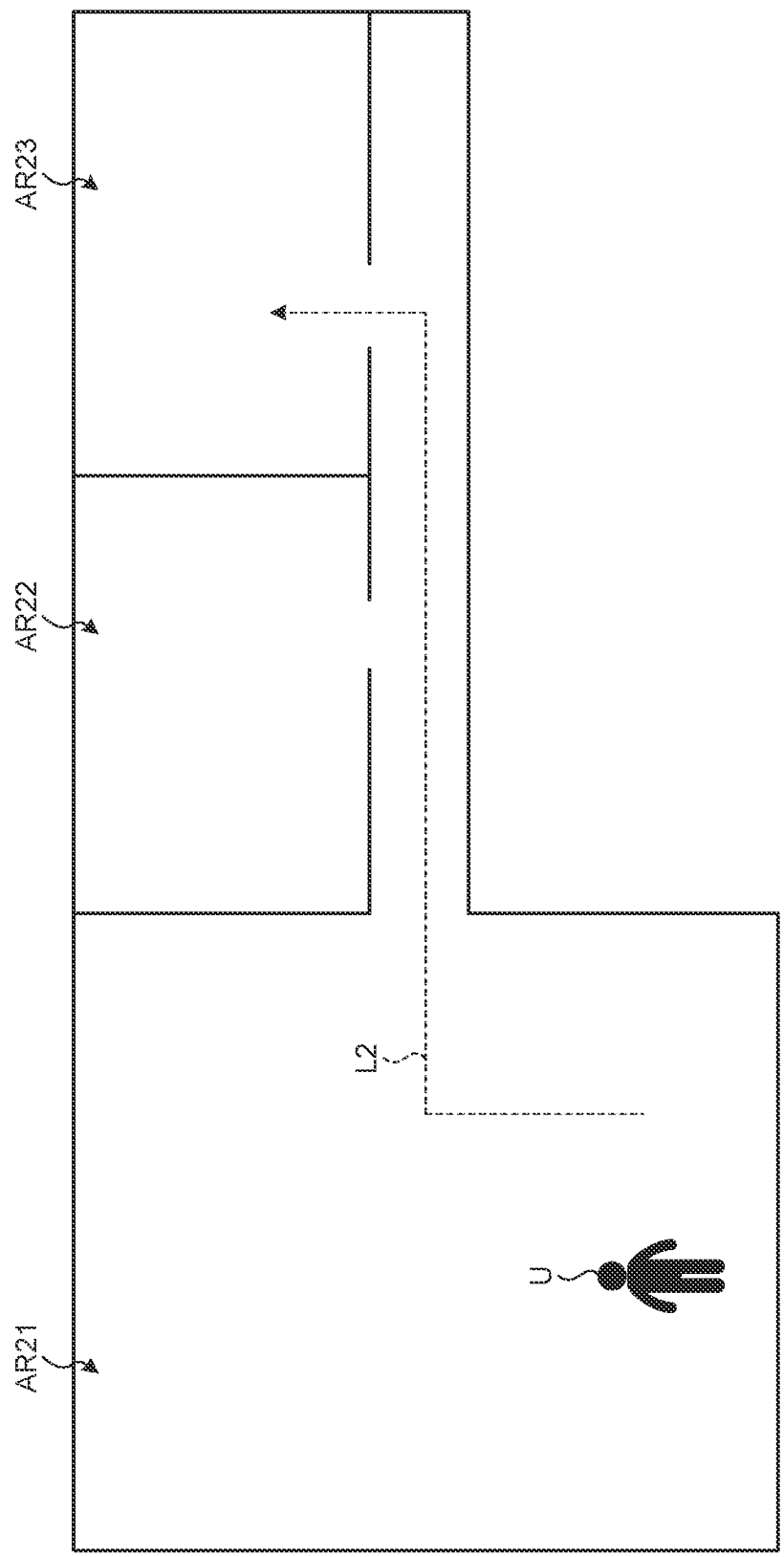
FIG. 23 is a diagram for describing an example of a method of setting a flow line according to the fourth embodiment.

The terminal device 10B sets a flow line showing a path of movement of the user between areas (step S160). Specifically, the flow-line setting unit 54 sets the flow line in accordance with an input operation input to the input unit 20 by the user. The flow-line setting unit 54 may automatically set the flow line based on a floor plan or the like. FIG. 22 and FIG. 23 are diagrams for describing examples of a method of setting a flow line according to the fourth embodiment.

FIG. 22 illustrates an example of the residence environment the user U. An area AR11 is, for example, an area in which the user U works in the residence. An area AR12 is, for example, a bathroom. An area AR3 is, for example, a kitchen. As illustrated in FIG. 22, a flow line L1 is set between the area AR11 and the area AR13. The output control unit 46 causes the display unit 22 to display video data corresponding to FIG. 22. The user U can set the flow line L1 by tracing the path between the area AR11 and the area AR13 on the display unit 22. The flow-line setting unit 54 sets the path, which has been traced between the area AR11 and the area AR13 on the display unit 22 by the user U, as the flow line L1. The flow-line setting unit 54 may automatically set the flow line L1, for example, by predicting the flow line of the user U of a case of a break in the video data, which is displayed by the display unit 22, by using machine learning or the like. For example, in FIG. 22, plural flow lines may be set.

FIG. 23 illustrates an example of a workplace environment of the user U. An area AR21 is, for example, a business area where a seat of the user U is present. The area AR22 is, for example, a conference room. An area AR23 is, for example, a kitchenette. As illustrated in FIG. 23, a flow line L2 is set from the area AR21 to the area AR23. The method of setting the flow line L2 is the same as the method of setting the flow line L1 illustrated in FIG. 22. Therefore, the descriptions thereof are omitted. Hereinafter, a case in which whether or not the user U has moved along the flow line L1 in a residence environment is taken as an example for explanation.

The detection device 12A becomes a standby state for detecting the movement of the user U along the flow line L1 (step S162). Then, the process proceeds to step S164.

Figure 24:
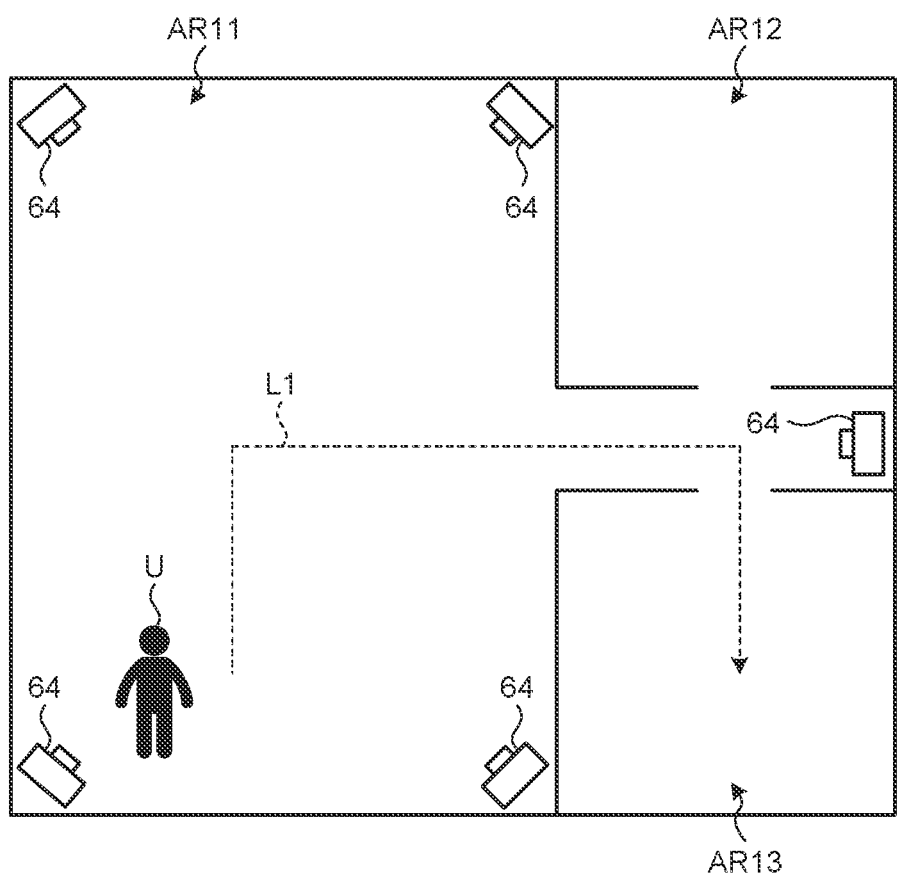
FIG. 24 is a diagram for describing an example of a method of detecting movement along a flow line according to the fourth embodiment.

The detection device 12A determines whether or not the user U has moved along the flow line L1 (step S164). FIG. 24 is a diagram for describing an example of a method of detecting the movement along a flow line according to the fourth embodiment. As illustrated in FIG. 24, for example, the position detection sensors 64 are disposed at four corners of the area AR11. The position detection sensor 64 can be disposed also at a passage from the area AR11 to the area AR12 and the area AR13. The position detection sensors 64 are the cameras which capture images of the user U. In this case, the flow-line-movement detection unit 87 determines that the user U has moved along the flow line L1, for example, when an image of the user U walking the path on which the flow line L1 is set is captured. The case in which the image of the user U walking the path on which the flow line L1 is set is not limited to the exact matching of the position of the user with the flow line L1, but may include a case in which there is a gap within a predetermined range. In the determination whether the user U has moved along the flow line L1 or not, the walking direction of the user may not be considered or may be considered. More specifically, it may be determined that the user U has moved along the flow line L1 only when the user U walks along the flow line L1 toward the direction of an arrow of the flow line L1 in FIG. 24, or it may be determined that the user U has moved along the flow line L1 also when the user U walks along the flow line L1 in the opposite direction of the arrow.

The flow-line-movement detection unit 87 may determine that the user U has moved along the flow line L1 when the track along which the user U has walked matches a starting point to an ending point of the flow line L1. The flow-line-movement detection unit 87 may determine that the user U has moved along the flow line L1 when the track the user U has walked matches the flow line L1 at an arbitrary rate. For example, when the user U has moved about half of the flow line L1, it may be determined that the user U has moved along the flow line L1.

The position detection sensor 64 may be a human detection sensor which detects the user U or a pressure sensor disposed on the floor. In such a case, when a pressure is detected in the path on which the flow line L1 is set, the flow-line-movement detection unit 87 can detect that the user U has moved along the flow line L1. The number of the position detection sensors 64 disposed for detecting the fact that the user U has moved along the flow line L1 may be arbitrary. If it is determined that the user U has moved along the flow line L1 (step S164; Yes), the process proceeds to step S168. If it is not determined that the user U has moved along the flow line L1 (step S164; No), the process proceeds to step S166.

The processes of step S166 to step S182 are the same as the processes of step S18 to step S34 illustrated in FIG. 5. Therefore, descriptions thereof are omitted.

First Modification Example of Fourth Embodiment

Figure 25:
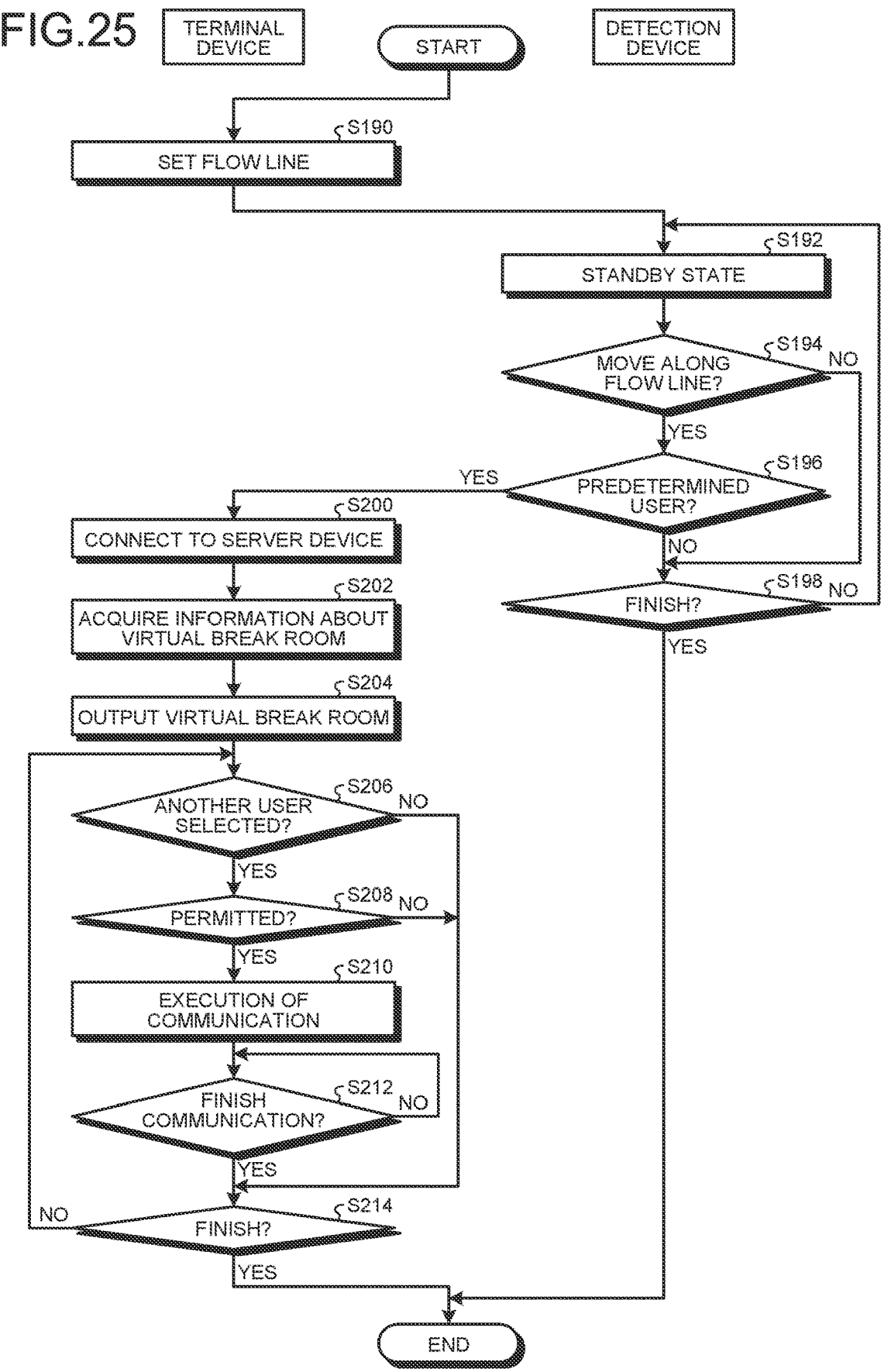
FIG. 25 is a flow chart illustrating a flow of a process of a virtual-break-room providing system according to a first modification example of the fourth embodiment.

The processing contents of a virtual-break-room providing system according to a first modification example of the fourth embodiment will be described by using FIG. 25. FIG. 25 is a flow chart illustrating the flow of the process of the virtual-break-room providing system according to the first modification example of the fourth embodiment.

The processes of step S190 to step S194 are the same as the processes of step S160 to step S164 illustrated in FIG. 21. Therefore, the descriptions thereof are omitted.

If it is determined Yes in step S194, the detection device 12 determines whether or not the user who moves along the flow line is a predetermined user (step S196). Since a specific process thereof is the same as the process of step S46 illustrated in FIG. 10, the descriptions thereof are omitted. If it is determined that the user who moves along the flow line is the predetermined user (step S196; Yes), the process proceeds to step S200. If it is not determined that the user who moves along the flow line is the predetermined user (step S196; No), the process proceeds to step S198.

The processes of step S198 to step S214 are the same as the processes of step S16 to step S32 illustrated in FIG. 5. Therefore, the descriptions thereof are omitted.

As described above, the first modification example of the fourth embodiment provides the virtual break room to the user only when it is determined that the user is the user registered in advance. By virtue of this, the first modification example of the fourth embodiment can more appropriately provide the virtual break room since providing the virtual break room to a wrong user can be prevented.

Second Modification Example of Fourth Embodiment

A second modification example of the fourth embodiment will be described. It has been described that the fourth embodiment automatically connects to the virtual break room when it is determined that the user has moved along the flow line. In the second modification example of the fourth embodiment, before the virtual break room is provided to the user, whether or not to connect to the virtual break room is confirmed.

The configuration of the virtual-break-room providing system according to the second modification example of the fourth embodiment is the same as the configuration of the virtual-break-room providing system illustrated in FIG. 1. Therefore, the descriptions thereof are omitted.

Process of Virtual-Break-Room Providing System

Figure 26:
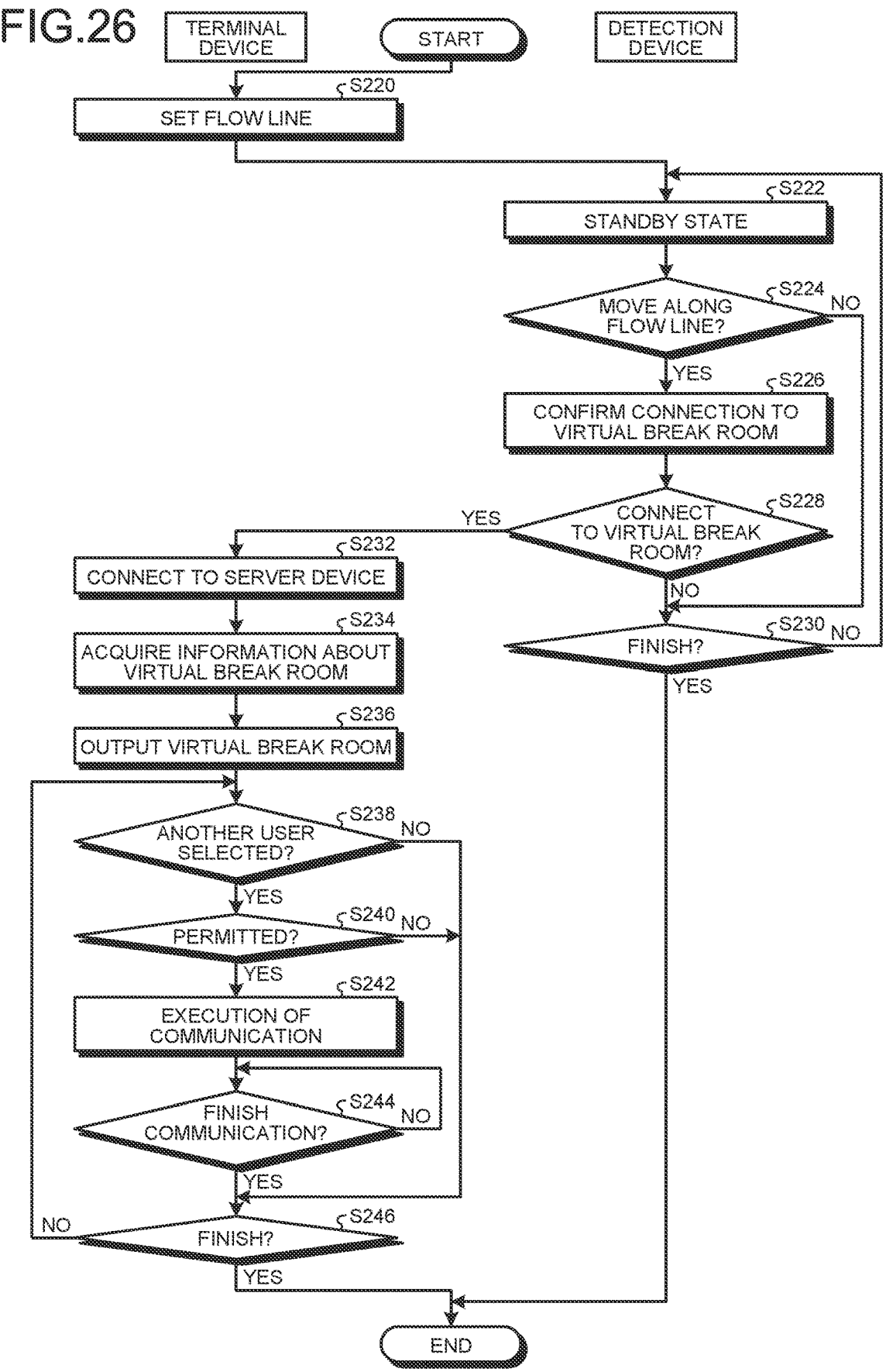
FIG. 26 is a flow chart illustrating a flow of a process of a virtual-break-room providing system according to a second modification example of the fourth embodiment.

The processing contents of the virtual-break-room providing system according to the second modification example of the fourth embodiment will be described by using FIG. 26. FIG. 26 is a flow chart illustrating the flow of the process of the virtual-break-room providing system according to the second modification example of the fourth embodiment.

The processes of step S220 to step S224 are the same as the processes of step S160 to step S164 illustrated in FIG. 21. Therefore, the descriptions thereof are omitted.

Figure 27:
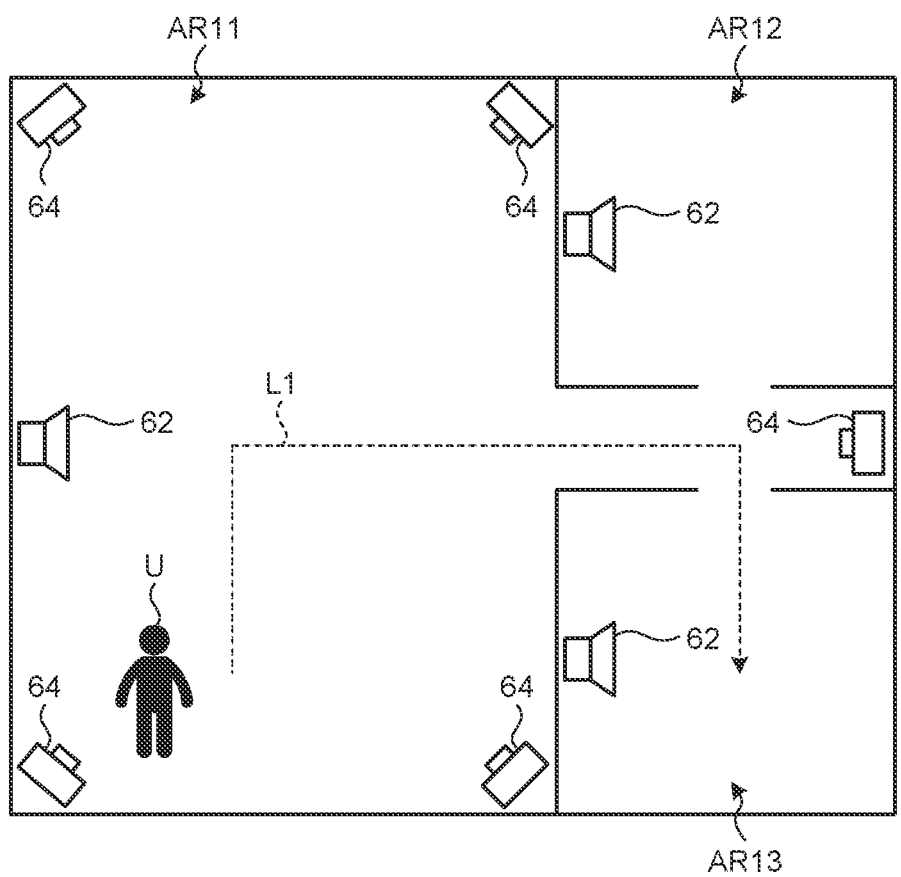
FIG. 27 is a diagram for describing a method of confirming whether or not to connect to a virtual break room according to the second modification example of the fourth embodiment.

When Yes is determined in step S224, the detection device 12A asks the user whether or not to connect to the virtual break room (step S226). FIG. 27 is a diagram for describing a method of confirming whether or not to connect to the virtual break room according to the second modification example of the fourth embodiment. The confirmation unit 84 asks the user U whether to connect to the virtual break room or not, for example, by outputting voice such as "Do you want to connect to the virtual break room?" from the sound output unit 62. The confirmation unit 84 may output, by the sound output unit 62, the information about the number of people connecting to the virtual break room such as "X people are connecting to the virtual break room. Do you want to connect to the virtual break room?". The confirmation unit 84 may output, by the sound output unit 62, the information that particular people such as friends, coworkers, and bosses are connecting to the virtual break room such as "A is connecting to the virtual break room. Do you want to connect to the virtual break room?". The plural sound output units 62 may be disposed in a residence environment. If the plural sound output units 62 are disposed, information may be output only from the sound output unit 62 which is at the position closest to the user U. Then, the process proceeds to step S228.

The process of step S228 is the same as the process of step S78 illustrated in FIG. 11. Therefore, the descriptions thereof are omitted.

The processes of step S230 to step S246 are the same as the processes of step S16 to step S32 illustrated in FIG. 5. Therefore, the descriptions thereof are omitted.

As described above, the second modification example of the fourth embodiment provides the virtual break room to the user only when the user wants to connect to the virtual break room. By virtue of this, the second modification example of the fourth embodiment can more appropriately provide the virtual break room to the user.

Fifth Embodiment

A fifth embodiment will be described. The fourth embodiment has been described to automatically connect to the virtual break room when it is determined that the user has moved along the flow line. In the fifth embodiment, the process of connecting to the virtual break room is executed when it is determined that the user has moved between areas.

Terminal Device

Figure 28:
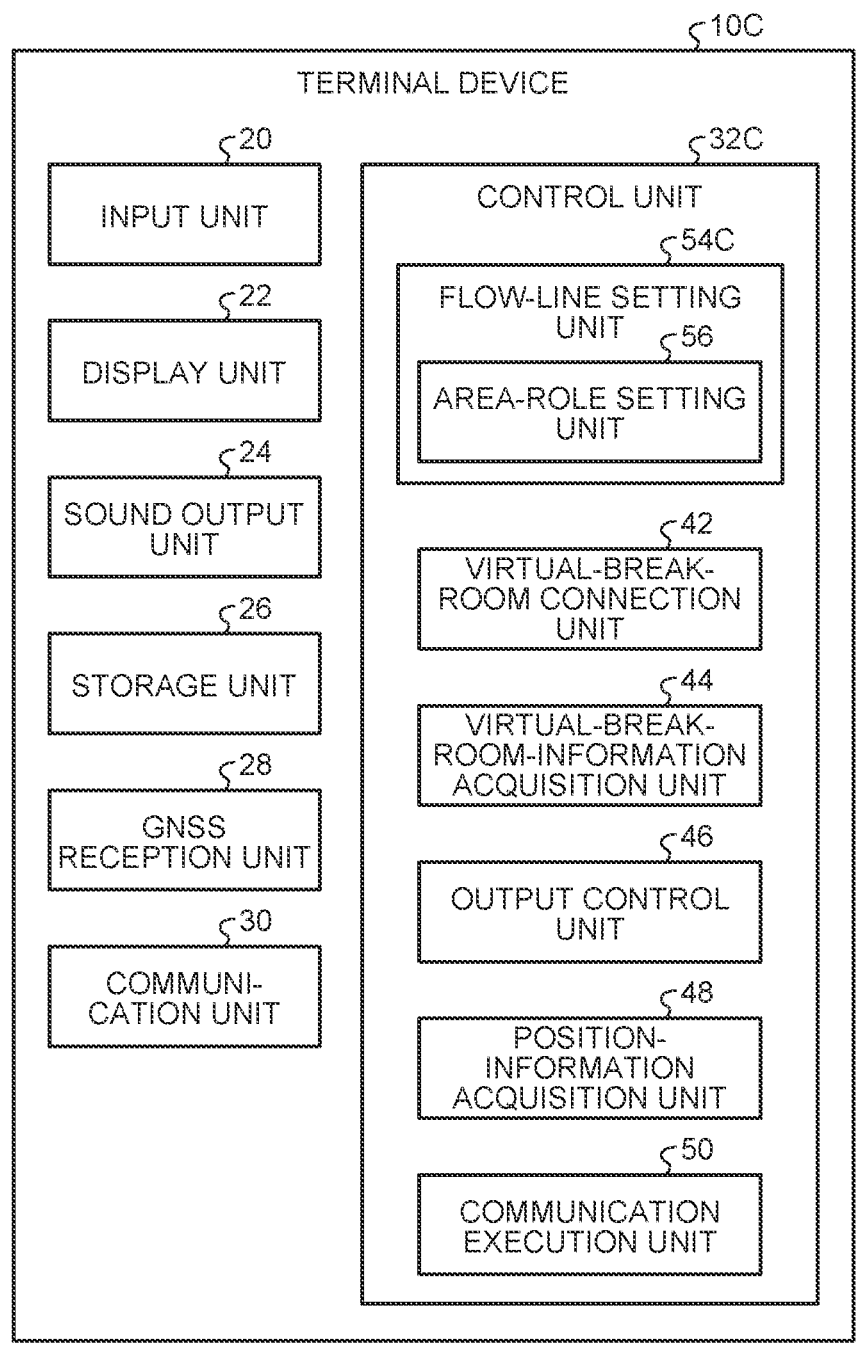
FIG. 28 is a block diagram illustrating a configuration example of a terminal device according to a fifth embodiment.

A configuration example of a terminal device according to the fifth embodiment will be described by using FIG. 28. FIG. 28 is a block diagram illustrating the configuration example of the terminal device according to the fifth embodiment.

As illustrated in FIG. 28, a terminal device 10B is different from the terminal device 10B illustrated in FIG. 19 in the points that a control unit 32C is provided with a flow-line setting unit 40C and that a flow-line setting unit 54C is provided with an area-role setting unit 56.

The area-role setting unit 56 sets an area which provides a virtual break room to the user. Details of the area-role setting unit 56 will be described later.

Detection Device

Figure 29:
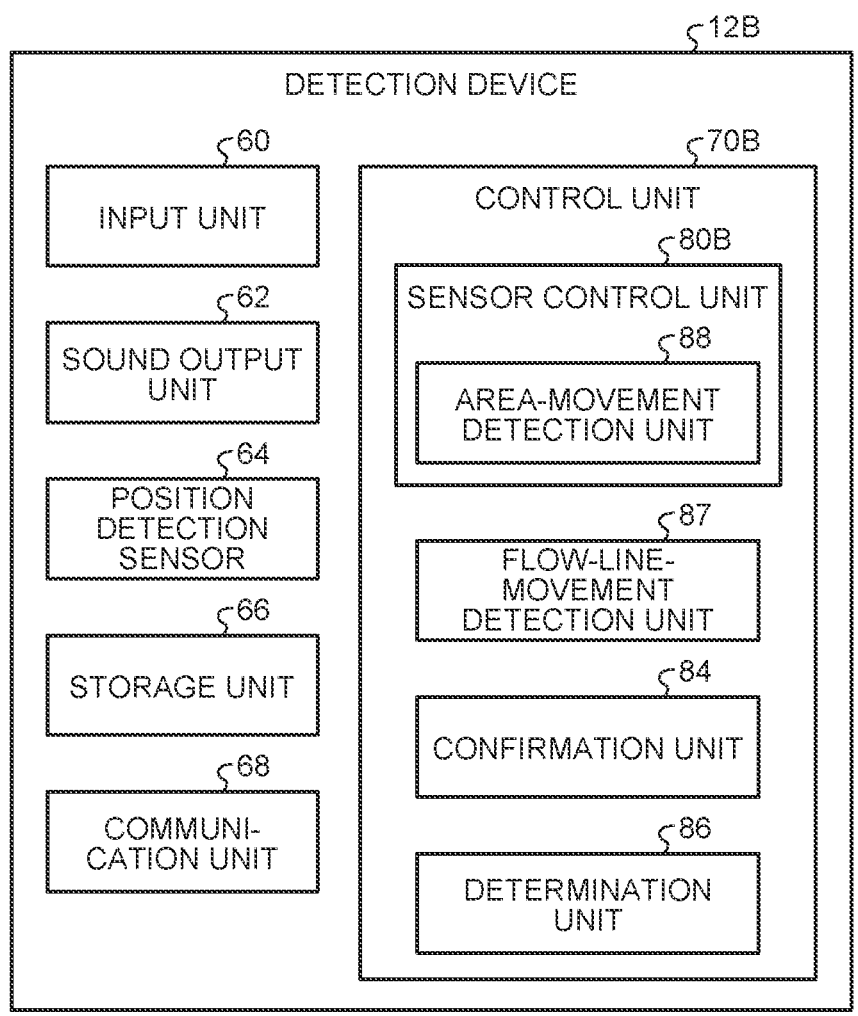
FIG. 29 is a block diagram illustrating a configuration example of a detection device according to the fifth embodiment.

A configuration example of a detection device according to the fifth embodiment will be described by using FIG. 29. FIG. 29 is a block diagram illustrating the configuration example of the detection device according to the fifth embodiment.

As illustrated in FIG. 29, a detection device 12B is different from the detection device 12A illustrated in FIG. 20 in the point that a sensor control unit 80B of a control unit 70B is provided with an area-movement detection unit 88.

The area-movement detection unit 88 detects the movement of the user to the area set in advance. The area-movement detection unit 88 detects the movement of the user to the area set in advance based on the detection result of the position detection sensor 64 about the position of the user. Details of the area-movement detection unit 88 will be described later.

Process of Virtual-Break-Room Providing System

Figure 30:
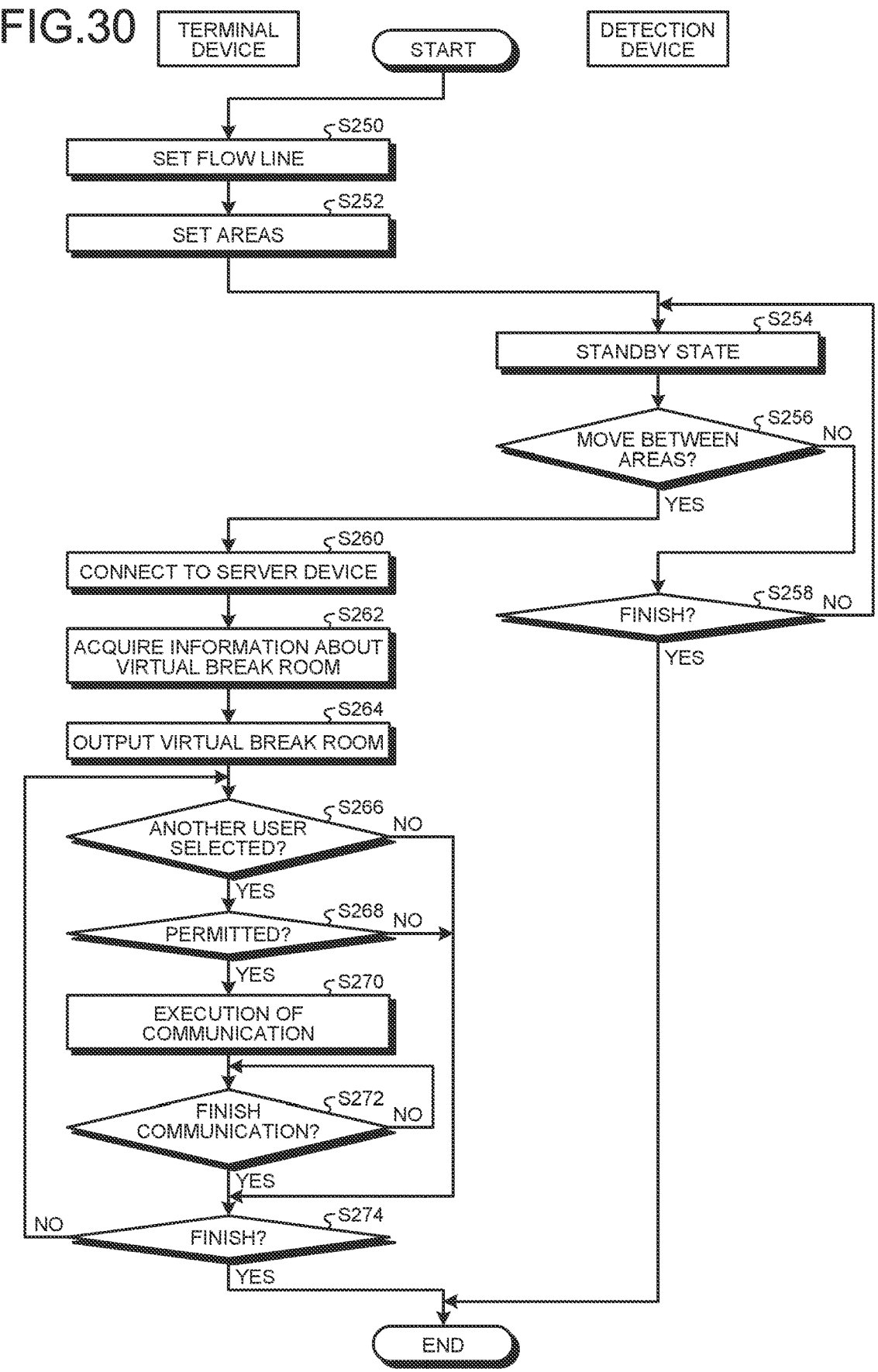
FIG. 30 is a flow chart illustrating a flow of a process of a virtual-break-room providing system according to the fifth embodiment.

Processing contents of a virtual-break-room providing system according to the fifth embodiment will be described by using FIG. 30. FIG. 30 is a flow chart illustrating the flow of the process of the virtual-break-room providing system according to the fifth embodiment.

Since the process of step S250 is the same as the process of step S160 illustrated in FIG. 21, the descriptions thereof are omitted. Note that step S250 may be omitted in the present embodiment.

A terminal device 10C sets an area (step S252). The area-role setting unit 56 sets the area which provides a virtual break room to the user. The area-role setting unit 56 sets, for example, the role of each area in a residence environment or the like. The area-role setting unit 56 sets, for example, a living room as an area for business. In this case, the living room is one type of a first area of the present embodiment. The area-role setting unit 56 sets, for example, a kitchen as an area which provides a virtual break room. In this case, the kitchen is one type of a second area of the present embodiment. In this case, in the case of the residence environment, for example, the movement to provide the virtual break room is determined when the user moves from the living room to the kitchen. In the case of an outside environment such as a company, for example, the movement to provide the virtual break room is determined when the user moves from his/her seat in the living room to the kitchen. By virtue of this, at the same timing, the virtual break room can be provided to the users who move to the kitchen determined in advance. Then, the process proceeds to step S254.

In other words, the area-role setting unit 56 sets the first area and the second area, which is different from the first area. The first area is the area where the user carries out business, the first area is a living room, a user's room, or the like in a residence environment, and the first area is a business area, a conference room, or the like in a workplace environment. The second area is a break area for the user to have a break, the second area is a kitchen, a bathroom, or the like in a residence environment, and the second area is a kitchenette or the like in a workplace environment. The area-role setting unit 56 may automatically set the first area and the second area, for example, by predicting the business area and the break area of the user by using machine learning or the like.

The process of step S254 is the same as the process of step S162 illustrated in FIG. 21. Therefore, the descriptions thereof are omitted.

Figure 31:
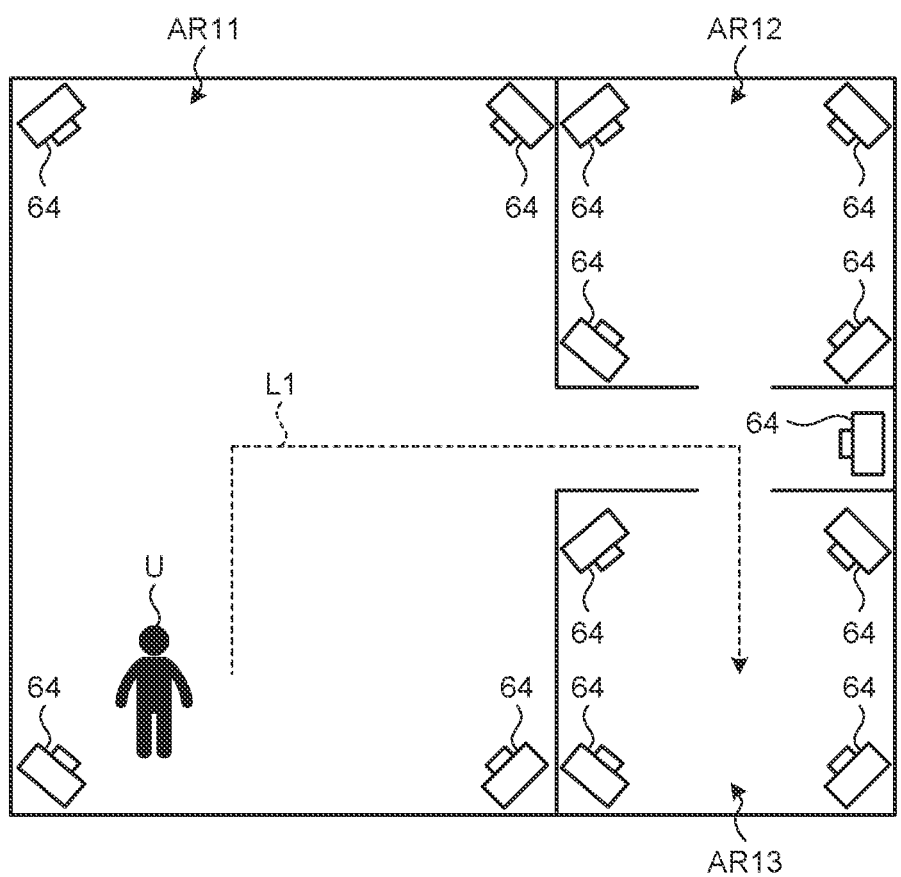
FIG. 31 is a diagram for describing an example of a method of detecting movement between areas according to the fifth embodiment.

The detection device 12B determines whether or not the user U has moved between the areas (step S256). FIG. 31 is a diagram for describing an example of a method of detecting the movement between the areas according to the fifth embodiment. As illustrated in FIG. 31, for example, the position detection sensors 64 are disposed at four corners of each of the area AR11, the area AR12, and the area AR13. The position detection sensor 64 is disposed also in a passage from the area AR11 to the area AR12 and the area AR13. The position detection sensors 64 are cameras which capture images of the user U. In this case, if the area AR1 is a living room and the area AR3 is a kitchen, the area-movement detection unit 88 detects, based on an image capturing result of the cameras, the point of time when the user U leaves the area AR1 and enters the area AR3. If the position detection sensors 64 are human detection sensors or pressure sensors, the position detection sensor 64 may be disposed at the entrance of each area, and the area-movement detection unit 88 may detect movement of the user U between the areas based on the detection result of the position detection sensor 64 at the entrance of each area. If it is determined that the user U has moved between the areas (step S256; Yes), the process proceeds to step S260. If it is not determined that the user U has moved between the areas (step S256; No), the process proceeds to step S258.

In other words, the area-movement detection unit 88 detects whether the user U has moved from the first area to the second area or not. More specifically, the area-movement detection unit 88 detects whether the user U has left the first area and entered the second area or not.

In step S256, the area-movement detection unit 88 may detect that the user U has left the second area, determine that the user U has moved between the areas (step S256; Yes), and advance the process to step S260. By virtue of this, when the user finishes things to do in the kitchen, the bathroom, or the like which is the second area and then returns to the living room which is the first area, the user can communicate with other users.

The processes of step S256 to step S274 are the same as the processes of step S166 to step S182 illustrated in FIG. 21. Therefore, the descriptions thereof are omitted.

As described above, in the fifth embodiment, the virtual break room is provided to the user when it is determined that the user has moved to the area such as a kitchen set in advance. By virtue of this, the user who is teleworking or the like can communicate, in the virtual break room, with other users who have moved to a kitchen or the like in the office or the like at the same timing. Therefore, lack of communication in a telework environment or the like can be solved.

Modification Example of Fifth Embodiment

Next, a modification example of the fifth embodiment of the present disclosure will be described. In the modification example of the fifth embodiment, a break area for the user to have a break is set. Then, in the modification example of the fifth embodiment, the process of providing the virtual break room to the user is executed when it is determined that the user has moved to the break area.

Process of Virtual-Break-Room Providing System

The processing contents of a virtual-break-room providing system according to the modification example of the fifth embodiment will be described by using FIG. 32.

Figure 32:
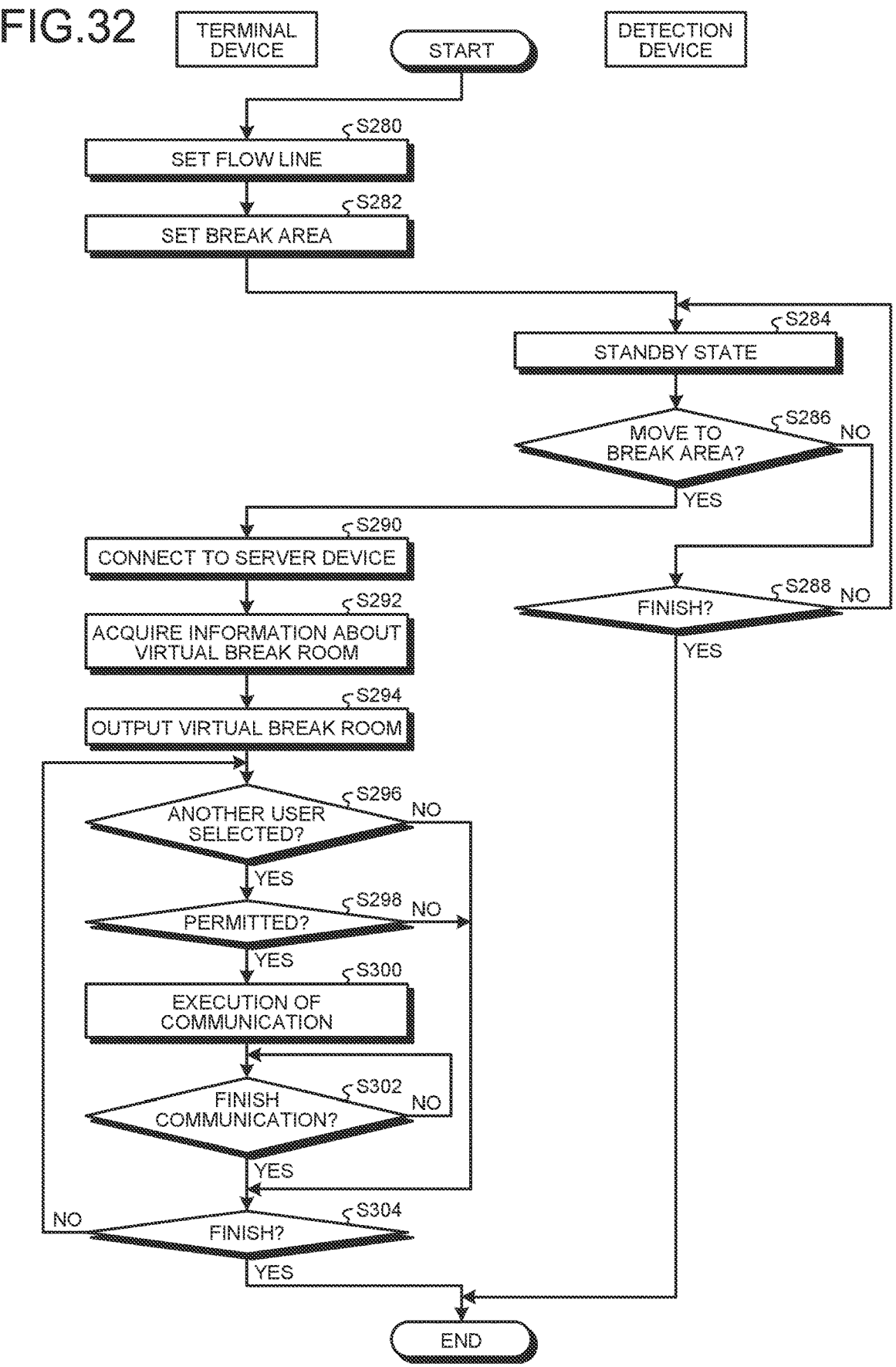
FIG. 32 is a flow chart illustrating a flow of a process of a virtual-break-room providing system according to a modification example of the fifth embodiment.

FIG. 32 is a flow chart illustrating the flow of the process of the virtual-break-room providing system according to the modification example of the fifth embodiment.

The process of step S280 is the same as the process of step S160 illustrated in FIG. 21. Therefore, the descriptions thereof are omitted.

The terminal device 10C sets a break area (step S282). The area-role setting unit 56 sets the break area for the user to have a break. By virtue of this, the virtual break room can be provided at the same timing to the users who move to the break area set in advance. Then, the process proceeds to step S284.

The process of step S284 is the same as the process of step S162 illustrated in FIG. 21. Therefore, the descriptions thereof are omitted.

The detection device 12B determines whether or not the user U has moved to the break area (step S286). Since the method of determining, by the detection device 12B, whether or not the user U has moved to the break area is the same as the process of step S256 illustrated in FIG. 30, the descriptions thereof are omitted. If it is determined that the user U has moved to the break area (step S286; Yes), the process proceeds to step S290. If it is not determined that the user U has moved to the break area (step S286; No), the process proceeds to step S288.

The processes of step S288 to step S304 are the same as the processes of step S166 to step S182 illustrated in FIG. 5. Therefore, descriptions thereof are omitted.

As described above, in the modification example of the fifth embodiment, the virtual break room is provided to the user when it is determined that the user has moved to the break area set in advance. By virtue of this, the user who is teleworking or the like can communicate in the virtual break room with other users who are having a break in an office or the like at the same timing. Therefore, lack of communication in a telework environment or the like can be solved.

Sixth Embodiment

A sixth embodiment will be described. The configuration of a virtual-break-room providing system according to the sixth embodiment is the same as the configuration of the virtual-break-room providing system illustrated in FIG. 13 except the point that the terminal device 10B illustrated in FIG. 19 is included instead of the terminal device 10. Therefore, the descriptions thereof are omitted.

The virtual-break-room providing system according to the sixth embodiment sets restaurants, cafes, parks, etc. as the areas to provide the virtual break room. The virtual-break-room providing system according to the sixth embodiment provides the virtual break room to the user when movement of the user from his/her home or the like to the area to provide the virtual break room is detected.

Process of Virtual-Break-Room Providing System

Figure 33:
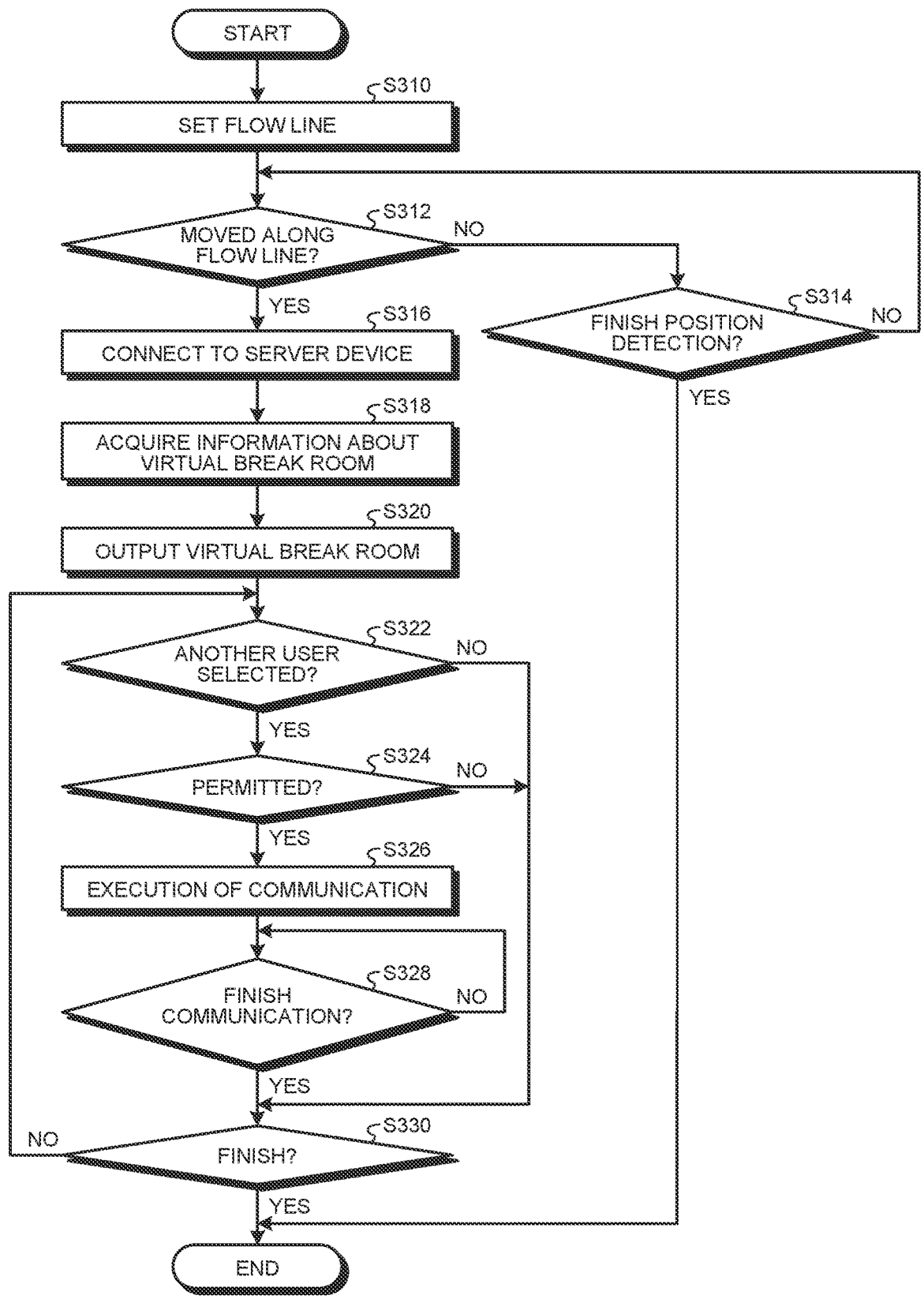
FIG. 33 is a flow chart illustrating a flow of a process of a virtual-break-room providing system according to a sixth embodiment.

The processing contents of the virtual-break-room providing system according to the sixth embodiment will be described by using FIG. 33. FIG. 33 is a flow chart illustrating the flow of the process of the virtual-break-room providing system according to the sixth embodiment.

Figure 34:
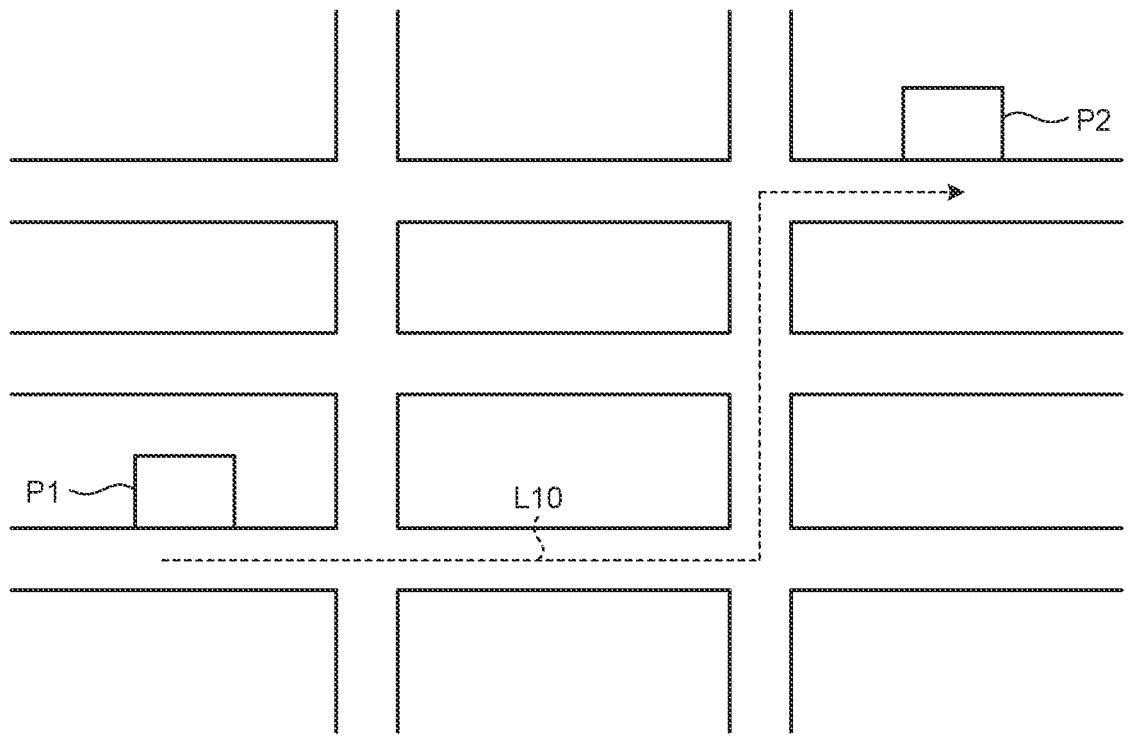
FIG. 34 is a diagram for describing an example of a method of setting a flow line according to the sixth embodiment.

The terminal device 10B sets a flow line (step S310). FIG. 34 is a diagram for describing an example of a method of setting the flow line according to the sixth embodiment. FIG. 34 illustrates map information from a home P1 to a cafe P2. The flow-line setting unit 54 sets a flow line L10 illustrating a path from the home P1 to the cafe P2. The flow-line setting unit 54 may set plural flow lines for the paths from the home P1 to the cafe P2. Then, the process proceeds to step S312.

The position-information acquisition unit 48 of the terminal device 10B determines whether or not the user U has moved along the flow line (step S312). Specifically, the position-information acquisition unit 48 determines that the user U has moved along the flow line L10 when the position information of the user U, which has been calculated based on the GNSS signal acquired from the GNSS reception unit 28, is on the flow line L10 set in step S310. Note that the case in which the position information of the user U is on the flow line L10 set in step S310 is not limited to strict matching of the position information, but may also include a case in which the position information is misaligned within a predetermined range. If it is not determined that the user U has moved along the flow line (step S312; No), the process proceeds to step S314. If it is determined that the user U has moved along the flow line (step S312; Yes), the process proceeds to step S316.

The method for the position-information acquisition unit 48 to acquire the position information of the user U in step S312 is not limited to the calculation based on the GNSS signal. For example, the position information of the user U may be acquired based on the images captured by image capturing devices such as unillustrated surveillance cameras or the like installed outdoors.

If it is determined No in step S312, the terminal device 10B determines whether or not to finish the position detection of the current position (step S314). Specifically, in a case in which an operation to turn off power is received, the terminal device 10B determines to finish the position detection of the current position when an operation to finish the position detection of the current position is received. If it is determined to finish the position detection of the current position (step S314; Yes), the process of FIG. 33 is finished. If it is not determined to finish the position detection of the current position (step S314; No), the process proceeds to step S312.

The processes of step S316 to step S330 are the same as the processes of step S168 to step S182 illustrated in FIG. 21. Therefore, the descriptions thereof are omitted.

As described above, in the sixth embodiment, the virtual break room is provided to the user when it is determined that the user has moved to a cafe or the like set in advance. By virtue of this, the sixth embodiment can solve lack of communication when the user, for example, goes out in a telework environment.

According to the present disclosure, users can appropriately communicate in a telework environment.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A virtual-break-room providing system comprising:
   a detection device comprising a detection unit configured to detect, based on a detection result of a position detection sensor about a position of a user, whether the user satisfies a condition to connect to a virtual break room that enables the user to communicate with another user in virtual space; and
   a terminal device comprising
      a virtual-break-room connection unit configured to connect to the virtual break room in response to a determination by the detection device that the user satisfies the condition to connect to the virtual break room,
      a virtual-break-room-information acquisition unit configured to acquire information about the virtual break room,
      an output control unit configured to output the information about the virtual break room, and
      a break-area-information acquisition unit configured to acquire break area information including information about a location of a break area of the user, the break area being set in real space,
   wherein
   the virtual-break-room-information acquisition unit acquires information of the virtual break room corresponding to the break area information,
   the output control unit causes a display unit to display the virtual break room corresponding to the break area information,
   the detection unit comprises an entrance detection unit configured to detect whether the user has entered a break area based on the detection result of the position detection sensor about the position of the user,
   the terminal device further comprises a break-area setting unit configured to set the break area of the user in real space,
   the virtual-break-room connection unit connects to the virtual break room in response to detecting entrance of the user into the break area,
   the position detection sensor is a camera,
   the detection device comprises a determination unit configured to determine, based on an image of the user captured by the camera, whether a user who has entered the break area is the user registered in advance, and
   the virtual-break-room connection unit connects to the virtual break room in response to determining that the user who has entered the break area is the user registered in advance.

2. The virtual-break-room providing system according to claim 1, wherein
   the detection device comprises a confirmation unit configured to ask the user whether to connect to the virtual break room, and the virtual-break-room connection unit connects to the virtual break room in response to receiving a request to connect to the virtual break room.

3. The virtual-break-room providing system according to claim 1, wherein
the detection unit comprises a flow-line-movement detection unit configured to determine, based on the detection result of the position detection sensor about the position of the user, whether the user has moved along a flow line set between areas,
the terminal device further comprises a flow-line setting unit configured to set the flow line showing a track of movement of the user between the areas, and
the virtual-break-room connection unit connects to the virtual break room in response to determining that the user has moved along the flow line.

4. The virtual-break-room providing system according to claim 3, wherein
the flow-line setting unit comprises an area-role setting unit configured to set a first area and a second area different from the first area,
the flow-line-movement detection unit comprises an area-movement detection unit configured to detect whether the user has moved from the first area to the second area, and
the virtual-break-room connection unit connects to the virtual break room in response to detecting the movement from the first area to the second area.

5. The virtual-break-room providing system according to claim 4, wherein the second area is a break area for the user to have a break.

6. A virtual-break-room providing device comprising:
a position-information acquisition unit configured to determine whether a user satisfies a condition to connect to a virtual break room that enables the user to communicate with another user in virtual space;
a virtual-break-room connection unit configured to connect to the virtual break room in response to determining that the user satisfies the condition to connect to the virtual break room;
a virtual-break-room-information acquisition unit configured to acquire information about the virtual break room;
an output control unit configured to output the information about the virtual break room; and
a break-area-information acquisition unit configured to acquire break area information including information about a location of the break area of the user, the break area being set in real space,
wherein
the virtual-break-room-information acquisition unit acquires information of the virtual break room corresponding to the break area information,
the output control unit causes a display unit to display the virtual break room corresponding to the break area information,
the position-information acquisition unit comprises an entrance detection unit configured to detect whether the user has entered a break area based on a detection result of a position detection sensor about the position of the user,
the virtual-break-room providing device further comprises a break-area setting unit configured to set the break area of the user in real space,
the virtual-break-room connection unit connects to the virtual break room in response to detecting entrance of the user into the break area,
the position detection sensor is a camera,
the position-information acquisition unit further comprises a determination unit configured to determine, based on an image of the user captured by the camera, whether a user who has entered the break area is the user registered in advance, and
the virtual-break-room connection unit connects to the virtual break room in response to determining that the user who has entered the break area is the user registered in advance.

7. A virtual-break-room providing method, comprising:
detecting, based on a detection result of a position of a user obtained from a camera, whether the user satisfies a condition to connect to a virtual break room that enables the user to communicate with another user in virtual space;
connecting to the virtual break room in response to detecting that the user satisfies the condition to connect to the virtual break room;
acquiring information about the virtual break room;
outputting information about the virtual break room; and
acquiring break area information including information about a location of the break area of the user, the break area being set in real space,
wherein
the acquiring of the information about the virtual break room comprises acquiring information of the virtual break room corresponding to the break area information,
the outputting of the information about the virtual break room comprises causing a display unit to display the virtual break room corresponding to the break area information,
the detecting of whether the user satisfies the condition comprises detecting whether the user has entered a break area based on the detection result of the position of the user, and
the method further comprises:
setting the break area of the user in real space;
connecting to the virtual break room in response to detecting entrance of the user into the break area,
determining, based on an image of the user captured by the camera, whether a user who has entered the break area is the user registered in advance, and
connecting to the virtual break room in response to determining that the user who has entered the break area is the user registered in advance.

* * * * *